(12) United States Patent
Xu et al.

(10) Patent No.: US 8,266,203 B2
(45) Date of Patent: Sep. 11, 2012

(54) METHOD FOR OBTAINING DEVICE INFORMATION OF USER TERMINALS AND COMMUNICATION SERVICE FUNCTION ENTITY

(75) Inventors: Guojun Xu, Shenzhen (CN); Lunjian Mu, Shenzhen (CN); Jue Wang, Shenzhen (CN); Gang Liang, Shenzhen (CN); Xiaobo Wang, Shenzhen (CN); Cheng Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 400 days.

(21) Appl. No.: 12/635,452
(22) Filed: Dec. 10, 2009
(65) Prior Publication Data

US 2010/0088371 A1    Apr. 8, 2010

Related U.S. Application Data

(63) Continuation of application No. PCT/CN2008/070534, filed on Mar. 19, 2008.

(30) Foreign Application Priority Data

Jul. 25, 2007  (CN) .......................... 2007 1 0129762
Dec. 7, 2007  (CN) .......................... 2007 1 0197095

(51) Int. Cl.
*G06F 15/16*    (2006.01)
(52) U.S. Cl. ......... 709/203; 709/228; 370/467; 370/400
(58) Field of Classification Search .................... 703/203
See application file for complete search history.

(56) References Cited

U.S. PATENT DOCUMENTS

2003/0236892 A1  12/2003  Coulmbe
2005/0154698 A1  7/2005  Ikezawa et al.
2006/0121919 A1  6/2006  Amishima et al.
2006/0193345 A1  8/2006  Matsuda et al.
2006/0291481 A1 * 12/2006  Kumar ......................... 370/400

FOREIGN PATENT DOCUMENTS

CN    1638339 A    7/2005
CN    1656789 A    8/2005

(Continued)

OTHER PUBLICATIONS

Office Action issued in corresponding Chinese Patent Application No. 200710197095.0, mailed Apr. 26, 2011.

(Continued)

*Primary Examiner* — Tammy Nguyen
(74) *Attorney, Agent, or Firm* — Brinks Hofer Gilson & Lione

(57) ABSTRACT

A method for obtaining device information of user terminals and a communication service function thereof are disclosed to enable a user to obtain terminal device information. The method for obtaining device information of user terminals in a communication system includes that a communication service function sends device information of a target user to a requesting terminal according to the target user ID carried in a device information obtaining request or a device information publish service setting. The communication service function includes: a receiving unit, adapted to receive a device information obtaining request or a device information publish service setting; a sending unit, adapted to send the stored device information of the target user to the requesting terminal according to the target user ID carried in the device information obtaining request or device information publish service setting.

15 Claims, 14 Drawing Sheets

FOREIGN PATENT DOCUMENTS

| | | | |
|---|---|---|---|
| CN | 1751482 | A | 3/2006 |
| CN | 1754368 | A | 3/2006 |
| CN | 1758785 | A | 4/2006 |
| CN | 101355797 | B | 12/2011 |
| EP | 1 638 268 | A1 | 3/2006 |

OTHER PUBLICATIONS

Office Action issued in corresponding European Patent Application No. 08715270.8, mailed May 9, 2011.

"Converged IP Messaging Requirements—Draft Version 1.0" (Clean Version) Open Mobile Alliance. Aug. 13, 2010.

"Converged IP Messaging Requirements—Draft Version 1.0" (Redlined Version) Open Mobile Alliance. Aug. 13, 2010.

Written Opinion of the International Searching Authority issued in corresponding PCT Application No. PCT/CN2008/070534; mailed Jun. 19, 2008.

Supplementary European Search Report issued in corresponding European Patent Application No. 08 71 5270; issued Jul. 27, 2010.

\* cited by examiner

METHOD FOR OBTAINING DEVICE INFORMATION OF USER TERMINALS AND COMMUNICATION SERVICE FUNCTION ENTITY

CROSS-REFERENCE TO RELATED APPLICATIONS

This application is a continuation of International Application No. PCT/CN2008/070534, filed on Mar. 19, 2008, which claims priority to Chinese Patent Application No. 200710197095.0, filed on Dec. 7, 2007 and Chinese Patent Application No. 200710129762.1, filed on Jul. 25, 2007, all of which are hereby incorporated by reference in their entireties.

FIELD OF THE INVENTION

The present invention relates to the communication field, and in particular, to a method for obtaining device information of user terminals and a Communication Service Function entity thereof in a communication system.

BACKGROUND OF THE INVENTION

The Session Initiation Protocol (SIP), being a part of an Internet Engineering Task Force (IETF) standard process, is used for setting up, modifying and terminating a multimedia session between messaging users in an IP network. The multimedia session includes Internet multimedia meetings, calls in the IP network, and multimedia publishing. SIP is a text-based signaling control protocol that works in client/server mode. SIP servers are categorized into stateful servers and stateless servers. A stateful server may store received, returned or forwarded messages, while a stateless server can only receive, return or forward messages, and cannot store these messages.

In the conventional art, an IP multimedia subsystem (IMS) is a standard system supporting IP multimedia services and independent of access technologies. The IMS is a SIP-based system, which establishes, manages and terminates various multimedia services by using a SIP call control mechanism.

To provide messaging users with better mobile data service experiences in heterogeneous networks among which differences exist in service package subscription, terminal capability and lower layer network environment. The current specifications support the development of mobile data services under a multi-device condition in the IMS. The multi-device condition means that a user ID corresponds to multiple terminals of the user, in which the user may communicate by using any of registered terminals. A user with multiple terminals is called a multi-device user.

In the conventional art, a multi-device user obtains device information based on the presence service. A presence server receives SIP PUBLISH requests from different terminals of the multi-device user. Each SIP PUBLISH request is intended to publish a presence information document including the presence information of the user, service and device. The presence server sends the obtained presence information to the requesting terminals through a SIP NOTIFY message. Any of the multiple terminals of the user plays two roles: a presence source, which is responsible for publishing information related to the terminal to the presence server; a presence information watcher, which is responsible for subscribing to the presence information of other terminals.

During the implementation of the invention, the inventor discovers that the user obtains terminal device information by subscribing to the presence information published by the presence service in the conventional art and that the conventional art has the following problems: When a multi-device user browses the presence information of other terminals by using one of the terminals, each terminal is identified by a unique terminal identifier (deviceID) allocated by the presence server, where the terminal identifier complies with the format of a universally unique identifier (UUID) defined in the conventional art. However, the multi-device user cannot easily differentiate and remember such identifies, and may be easily confused when browsing the presence information of multiple terminals. In addition, the multi-device user needs to transfer sessions between different terminals. Thus, the multi-device user must know state information such as the ID of a session in the source terminal and capability information of the target terminal. The presence information, however, indicates whether a terminal joins a session only, but does not indicate the state information of the session or the capability information of the terminal device. Therefore, the multi-device user cannot transfer sessions in other terminals to the current terminal.

SUMMARY OF THE INVENTION

Embodiments of the invention provide a method for obtaining device information of user terminals, a Communication Service Function entity entity, and a communication terminal in a communication system, so that the user obtains the terminal device information.

A method for obtaining device information of user terminals in a communication system provided in an embodiment of the invention includes:
  sending, by a Communication Service Function entity entity, device information of a target user to a requesting terminal according to an ID of the target user carried in a device information obtaining request or a device information publish service setting.

A Communication Service Function entity provided in an embodiment of the invention includes:
  a receiving unit, adapted to receive a device information obtaining request or a device information publish service setting; and
  a sending unit, adapted to send the stored device information of a target user to a requesting terminal according to an ID of the target user carried in the device information obtaining request or device information publish service setting.

A communication terminal provided in an embodiment of the invention includes:
  a sending unit, adapted to send a device information obtaining request or a device information publish service setting;
  a receiving unit, adapted to receive terminal device information of a specified target user in the device information obtaining request or device information publish service setting from a Communication Service Function entity entity; and
  a presenting unit, adapted to present the device information of the target user terminal received by the receiving unit.

The method for obtaining device information of user terminals and the Communication Service Function entity entity provided in embodiments of the invention enable the user to obtain his/her own device information or device information of other users from the Communication Service Function entity entity through a requesting terminal.

DETAILED DESCRIPTION OF THE INVENTION

A method for obtaining device information of user terminals in an embodiment of the invention allows the user to define a simple device display-name for each terminal. The device display-name is either carried in the terminal registration request so that it is obtained by a related Communication Service Function entity during the terminal registration, or published by a terminal to a related Communication Service Function entity so that the Communication Service Function entity associates the device display-name with a user ID and stores the device display-name in the device information of user terminals. In addition, the method for obtaining device information of user terminals in an embodiment of the invention allows the user to publish his/her terminal device capability information, such as hardware features (for example, the screen size and storage space) and software features (for example, the application program version and supported audio/video encoding format), and the information may be preset static capability information or dynamic capability information. The preceding device capability information is either obtained by a Communication Service Function entity from the terminal capability server or published by the terminal to the Communication Service Function entity entity; the Communication Service Function entity associates the device capability information with a user ID and stores the device display-name in the device information of user terminals; the Communication Service Function entity obtains the ongoing session state information when the session joined by the user terminal is changed, associates the session state information with a user ID and stores the session state information in the device information of user terminals.

Figure 1A:
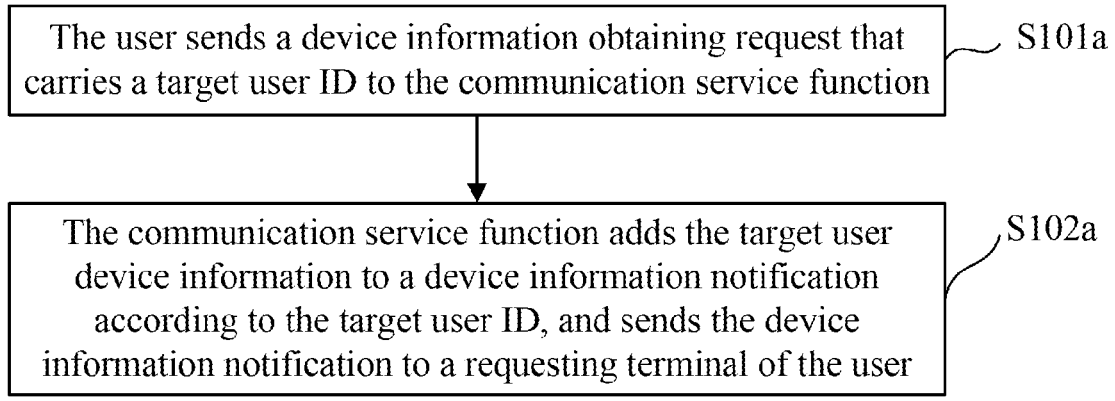
FIG. 1A and FIG. 1B are flowcharts of a method for obtaining device information by a user in an embodiment of the invention.

The Communication Service Function entity receives a request for obtaining device information of the target terminal, and sends the stored device information of the target terminal to the requesting terminal according to the target user ID carried in the request. As shown in FIG. 1a, the method includes the following steps:

S101a: The user sends a device information obtaining request that carries a target user ID to the Communication Service Function entity entity.

S102a: The Communication Service Function entity adds the device information of the target user to a device information notification according to the target user ID, and sends the device information notification to the requesting terminal of the user.

Figure 1B:
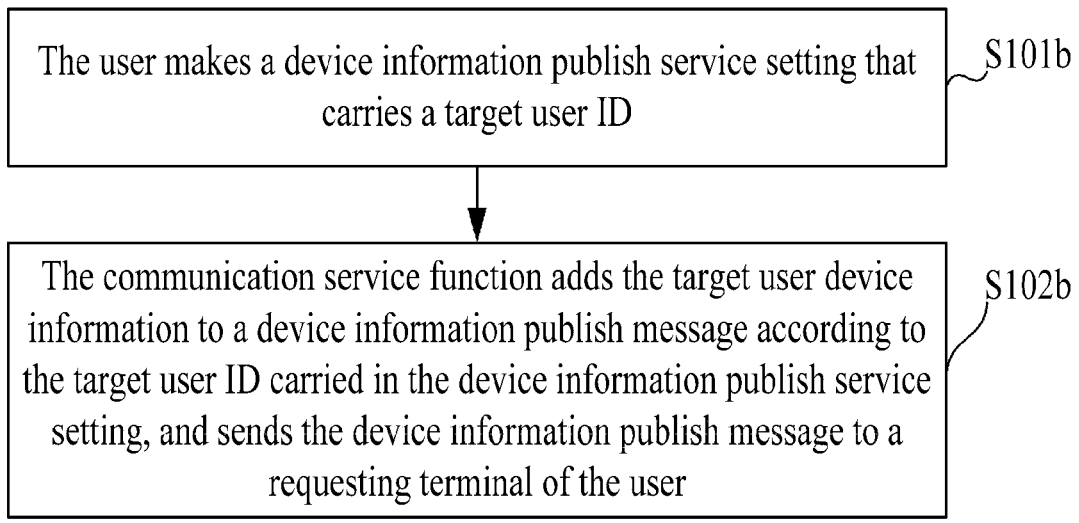

The Communication Service Function entity may also publish the device information of the target terminal to a specified receiving terminal of a user in the setting based on the device information publish service setting of the user. As shown in FIG. 1b, this process includes the following steps:

S101b: The user performs a device information publish service setting that carries a target user ID.

S102b: The Communication Service Function entity adds the device information of the target user to the device information publish message and publishes the device information publish message to the requesting terminal of the user according to the target user ID carried in the device information publish service setting.

This embodiment is used in a typical scenario, in which a multi-device user in the communication system requests his/her own device information from the Communication Service Function entity through a terminal; the user may use one of his/her terminals as the requesting terminal to send a device information obtaining request or a device information publish service setting to the Communication Service Function entity, where the target user ID carried in the device information obtaining request or in the device information publish service setting may be the ID of the user; the Communication Service Function entity sends the device information associated with the ID of the user to the requesting terminal.

If the device information received by the requesting terminal includes the device display-name of each terminal, the user may identify and differentiate the terminals by the device display-names.

If the device information received by the requesting terminal includes capability information of each terminal and state information of sessions in each terminal, the user may determine whether to and how to transfer a session according to the capability difference between terminals and the ongoing session state.

In the embodiment of the present invention, the user may also request device information of other users. That is, a user uses one of his/her terminals as the requesting terminal to send a device information obtaining request or device information publish service setting to the Communication Service Function entity, where the target user ID carried in the device information obtaining request or in the device information publish service setting is the ID of another user; the Communication Service Function entity sends the device information associated with the target user ID to the requesting terminal.

After obtaining and storing the terminal device information, the Communication Service Function entity sends the device information of the target user to the requesting terminal according to the obtaining request of the user or publishes the device information of the target user to the requesting terminal according to the device information publish service setting of the user. According to specific scenarios, the Communication Service Function entity may be a presence server that provides presence information services to other communication services, a Communication Service Function entity that executes specific communication service logic in a service implementation environment, a communication server, a communication network storage entity configured for the communication server or a communication service subscription terminal in a network where the communication server is located. The communication server includes a messaging server that provides messaging services, a voice server in voice communication services or a video server in video communication services.

The following describes embodiments of the invention, supposing the Communication Service Function entity is a presence server. For the specific implementation modes, refer to examples in the first, second and third embodiments.

Based on the implementation mode shown in FIG. 1a, the Communication Service Function entity in the first, second and third embodiments is a presence server, and the device information obtaining request is a presence information subscription request, with the device information carried in the presence information. In the first embodiment, the presence server obtains the device display-name based on the presence service, and sends the presence information that includes the device display-name to the requesting terminal according to the presence information obtaining request. In the second embodiment, the presence server obtains the device display-name from a SIP REGISTER request based on the registration process of a terminal in the presence service, and sends the presence information that includes the device display-name to the requesting terminal according to the presence information obtaining request. In the third embodiment, the presence server obtains terminal session state information based on the presence service, and sends the presence information that includes the terminal session state information to the requesting terminal according to the presence information obtaining request.

First Embodiment

The first embodiment provides a method for obtaining device display-name and/or device capability information based on the presence service. In this method, the presence information published in the existing presence service is extended and a presence information element "Per service device description" related to the terminal device information is added to support the implementation of obtaining the device display-name and device capability information based on the presence service.

The added presence information element is "Per service device description". The "Per service device description" is added to the "device" component defined in *A Data Model for Presence* to describe a terminal for executing a specific presence service, that is, the device display-name and current terminal capability information. The "Per service device description" is mapped to the presence information in the following mode:

<device>→<deviceID>→<device display-name> and/or <device-capability>

The following is an example of an extended presence information file:

```
... ...
<pdm:device id="a1233">
<pdm:deviceID>urn:uuid:48662e19-5fbf-43fc-a2fd-
d23002787599</pdm:deviceID>
```

-continued

```
<pdm:device-displayname>Bob's Mobile Phone</pdm:device-
displayname>
<pdm:device-capability>
  <ActiveScreenSize>30*50</ActiveScreenSize>
  <AvailableStorageMemory>100K</AvailableStorageMemory>
  <BatteryStatus>FULL</BatteryStatus>
</pdm:device-capability>
<pdm:timestamp>2005-02-21T16:25:56Z</pdm:timestamp>
</pdm:device>
... ...
```

The preceding code shows that the terminal ID allocated by the presence server for a terminal is "uuid: 48662e19-5fbf-43fc-a2fd-d23002787599", which is complex and difficult for the messaging user to differentiate and remember. Then, the messaging user defines the device display-name of the terminal as "Bob's Mobile Phone", which is simple and easy to remember and differentiate.

Figure 2:
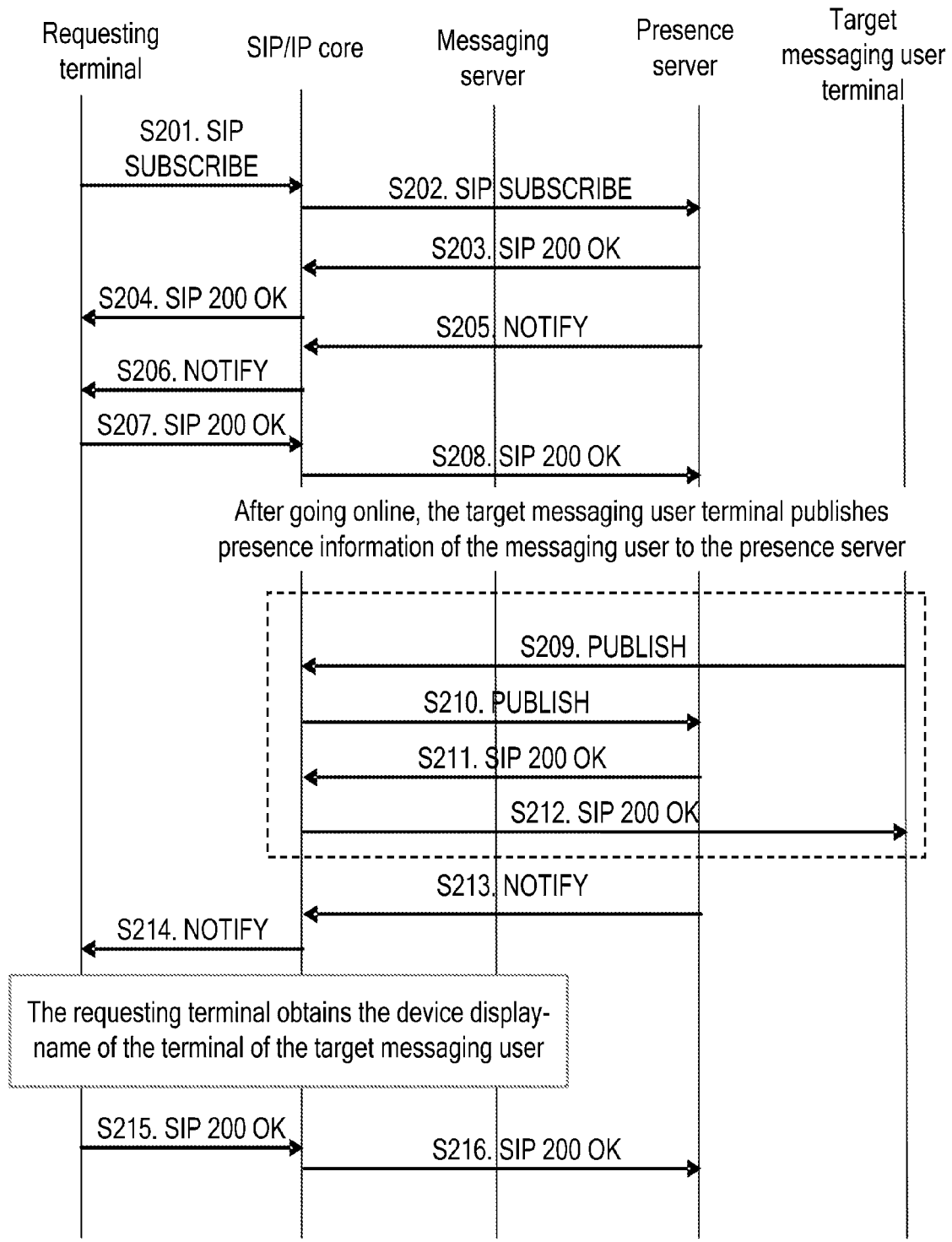
FIG. 2 is a flowchart of a method for obtaining device display-name and/or device capability information based on a presence service in a first embodiment of the invention.

The messaging user may obtain the device display-name and/or device capability information based on the presence service by extending the published presence information. FIG. 2 is a flowchart of obtaining the device display-name and/or device capability information based on the presence service. The following describes each entity shown in FIG. 2, supposing the multi-device messaging user subscribes to his/her presence information through a terminal.

UE1 . . . N indicate all the terminals owned by a multi-device messaging user, and include a messaging client and a presence client. In this process, the multi-device messaging user is also a target messaging user. Terminals UE1 . . . N act as the presence information publisher to publish the presence information of the multi-device messaging user, and also act as the presence information watcher to subscribe to the presence information of the messaging user. The messaging user selects UE1 as the requesting terminal and terminals UE2 . . . N as the target messaging user terminals.

The SIP/IP core indicates the core network that routes SIP messages.

The messaging server is responsible for executing messaging service logic control and providing the messaging user with messaging services.

The presence server is responsible for subscribing to and publishing the presence information of the messaging user.

The specific process includes the following steps:

S201 to S208: The multi-device messaging user sends a presence information subscription request (for example, SIP SUBSCRIBE) to the presence server through the SIP/IP core by using the requesting terminal UE1, where the presence information subscription request carries the ID of the multi-device messaging user, requesting to subscribe to the presence information of the messaging user.

The presence server receives the SIP SUBSCRIBE request from the UE1, and returns a SIP 200 OK response to the UE1 through the SIP/IP core.

S209 to S212: After each terminal in terminals UE2 . . . N is registered and goes online, the terminals send a presence information publish request (for example, SIP PUBLISH) to the presence server through the SIP/IP core, requesting to publish the presence information of the messaging user. The presence information published by each terminal includes a device display-name (for example, "Bob's Mobile Phone") of the terminal defined by the messaging user and/or device capability information of the terminal (for example, battery capacity and storage space).

After each terminal in terminals UE2 . . . N is registered and goes online successfully, the terminal re-sends the changed presence information that carries the device description information to the presence server if the user re-defines a new device display-name for a terminal or the device capability of a terminal in terminals UE2 . . . N is changed.

The presence server receives the presence information published by the terminal, and obtains the device display-name and/or device capability information of the terminal. In addition, the presence server associates the device display-name and/or device capability information of the terminal, stores the presence information of the messaging user published by terminals UE2 . . . N by associating with the ID of the messaging user, and returns a SIP 200 OK response to each terminal in terminals UE2 . . . N through the SIP/IP core.

Alternatively, the preceding presence information that carries the device display-name and/or device capability information may be sent by terminals UE2 . . . N to the home messaging server; the messaging server regards the presence information as the presence information special for the messaging service and sends presence information to the presence server; the UE1 of the messaging user obtains the presence information according to the SUBSCRIBE request.

S213 to S216: The presence server authorizes the subscription and controls the presence information delivery according to the presence information authorization rule and notification filtering policy of the messaging user. In this embodiment, the presence server sends a notification (for example, SIP NOTIFY) that carries the presence information of the multi-device messaging user to the UE1 through the SIP/IP core, where the presence information includes the device display-name and/or device capability information of terminals UE2 . . . N.

The UE1 receives the notification, obtains the device display-name and/or device capability information of terminals UE2 . . . N defined by the multi-device messaging user from the presence information, and returns a SIP 200 OK response to the presence server through the SIP/IP core.

The UE1 may present the presence information of terminals UE2 . . . N to the multi-device messaging user locally. The device display-names of terminals UE2 . . . N may facilitate the multi-device messaging user to identify and differentiate terminals UE2 . . . N.

Certainly, if the UE1 of the multi-device messaging user is registered and goes online, the presence information of the multi-device messaging user may further include a device display-name of the UE1 defined by the multi-device messaging user.

The first embodiment describes the process supposing terminals UE1 . . . N belong to the same multi-device messaging user. The process is similar to the preceding process. Supposing terminals UE2 . . . N are terminals of other messaging users, when the multi-device messaging user uses the UE1 as the requesting terminal to request the device information from other messaging users of terminals UE2 . . . N, the SIP SUBSCRIBE request carries IDs of other messaging users. Other messaging users may also send a SIP SUBSCRIBE request through their own requesting terminals, take the multi-device messaging user as the target messaging user to subscribe to the presence information of the multi-device messaging user, and obtain the presence information of the multi-device messaging user under the control of the authorization rule and notification filtering policy of the messaging user, where the presence information of the multi-device messaging user includes the device display-name and/or device capability information of terminals UE1 . . . N of the multi-device messaging user.

Second Embodiment

The second embodiment provides a method for obtaining a device display-name by a presence server based on a SIP REGISTER request. The SIP registration service creates a binding relationship for a location service in a specified area, where the binding relationship is used to create a uniform resource identifier (URI) that includes one or multiple contact addresses. The SIP REGISTER request is used to add, delete or search for the binding relationship. One SIP REGISTER request may add the binding relationship between one URI and one or multiple contact addresses. The URI may be registered after being authenticated by a proper third party. The terminals of the messaging user may also delete the previous binding relationship or search for current contact addresses of the URI.

The following describes parameters in the contact header field of the REGISTER request:
  Expires: This parameter indicates the valid time of the binding relationship, which is an integer in units of seconds;
  q: This parameter indicates the priority between contact addresses in a specific contact header field and other addresses bound to the URI.

The following describes an additional "d" parameter in the contact header field in this embodiment:
  d: This parameter indicates a device display-name used by a messaging user and corresponding to the contact address in the specific contact header field.

The following is a specific code:

Contact: "Mr.Watson" <sip:watson@worcester.bell-telephone.com>; q=0.7; d="Watson's bell-telephone"; expires=3600,
  "Mr. Watson" mailto:watson@bell-telephone.com; q=0.1; d = "Watson's mailbox"

Figure 3:
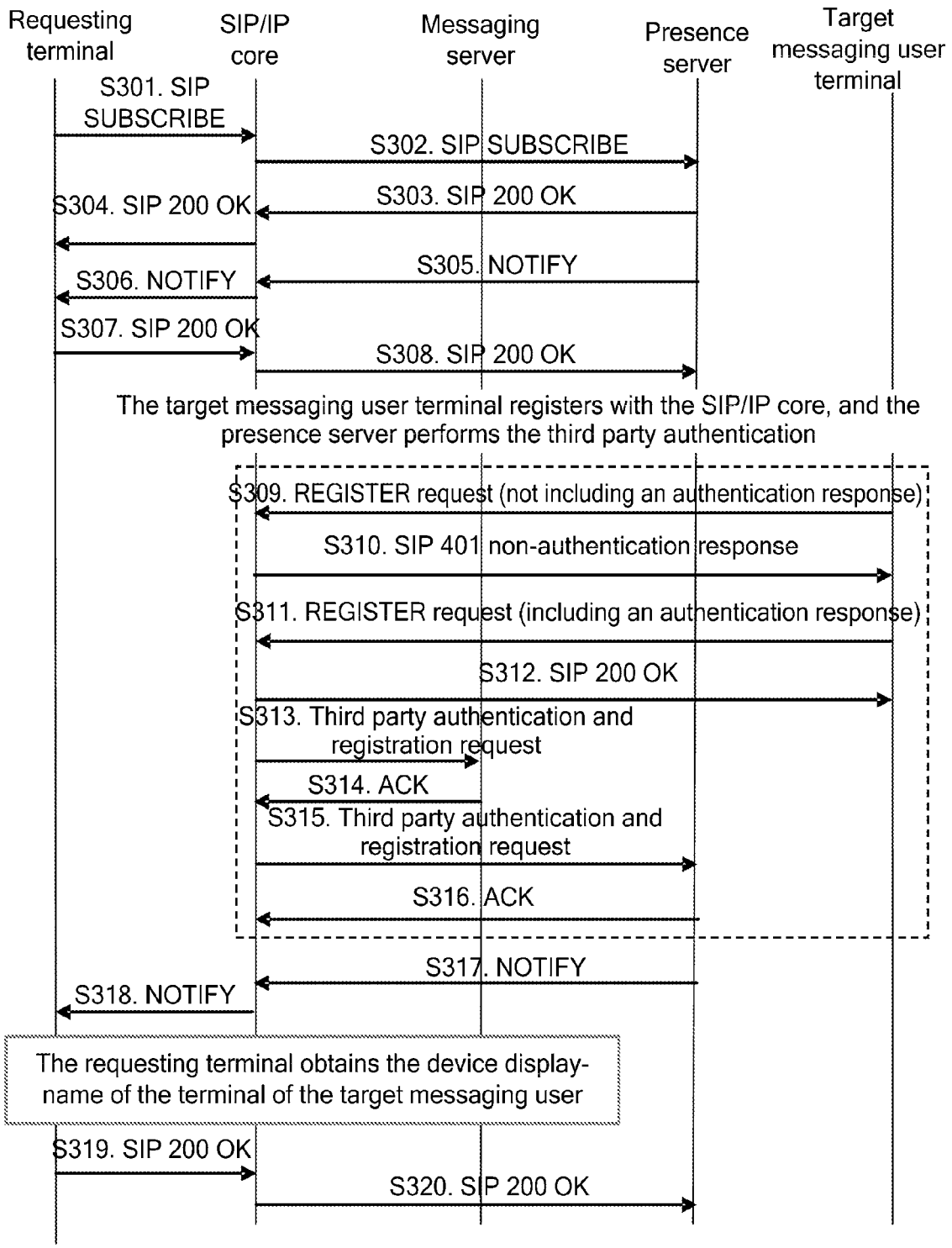
FIG. 3 is a flowchart of a method for obtaining a device display-name based on a SIP REGISTER request in a second embodiment of the invention.

FIG. 3 is a flowchart of obtaining a device display-name based on a SIP REGISTER request. The following describes each entity shown in FIG. 3, supposing the multi-device messaging user obtains his/her own presence information through a requesting terminal.

UE1 . . . N indicate all the terminals owned by a multi-device messaging user, and include a messaging client and a presence client. In this process, the multi-device messaging user is also a target messaging user. Terminals UE1 . . . N act as the presence information publisher to publish the presence information of the multi-device messaging user, and also act as the presence information watcher to subscribe to the presence information of the messaging user. The messaging user selects UE1 as the requesting terminal.

The SIP/IP core indicates the core network that routes the SIP messages, and in the SIP/IP core, the home subscriber server (HSS) stores the subscription information of the messaging user, including integrated data such as basic ID, routing information and service subscription information; the serving-call session control function (S-CSCF) is the service switching center and authenticates the messaging user of terminals through corporation with the HSS.

The messaging server is responsible for executing messaging service logic control and providing the messaging user with messaging services.

The presence server is responsible for subscribing to and publishing the presence information of the messaging user.

The specific process includes the following steps:

S301 to S308: The multi-device messaging user sends a presence information subscription request (for example, SIP SUBSCRIBE) to the presence server through the SIP/IP core by using the UE1, requesting to subscribe to the presence information of the messaging user.

The presence server receives the SIP SUBSCRIBE request from the UE1, authenticates the received SIP SUBSCRIBE request according to the presence information authorization rule of the messaging user, and returns a SIP 200 OK response to the UE1 through the SIP/IP core.

S309 to S312: After each of terminals UE2 . . . N goes online, the terminals may send a SIP REGISTER request to the S-CSCF in the SIP/IP core to register the contact addresses and establish the binding relationship between the contact addresses and the URI, where the SIP REGISTER request carries the "d" parameter in the contact header field. The value of the "d" parameter defines a device display-name for the terminal, for example, "Bob's Mobile Phone". The following is a specific code:

Contact: <sip:bob@192.0.2.4>;d="Bob's mobile phone"

If the received SIP REGISTER request lacks complete protection for the authenticity of the messaging user identity, the S-CSCF may request an authentication vector from the HSS in the SIP/IP core, and return a 301 Unauthorized response; the terminal generates a new SIP REGISTER request carrying an authentication response and sends it to the S-CSCF; after authenticating the messaging user identity successfully, the S-CSCF records the contact address of the messaging user carried in the SIP REGISTER request, and notifies the HSS of registering the messaging user successfully; the S-CSCF returns a SIP 200 OK response to terminals UE2 . . . N.

S313 to S316: After each of terminals UE2 . . . N is registered successfully, the S-CSCF sends a third party registration request to the messaging server and presence server, where the third party registration request carries messaging user registration state information that includes the device display-name of the terminal. After receiving the third party registration request, the presence server obtains the device display-name of the terminal from the messaging user registration state information, associates the device display-name of the terminal with the user ID and stores it as the presence information of the user, and returns a response indicating successful receipt of the third party registration request to the S-CSCF.

The S-CSCF may also send the third party registration request to only the messaging server; the messaging server acts as the presence source to send a SIP PUBLISH message to the presence server, requesting to publish the messaging user registration state information that includes the device display-name of the terminal; the presence server obtains the device display-name of the terminal from the messaging user registration state information, associates the device display-name of the terminal with the user ID and stores it as the presence information of the user, and returns a SIP 200 OK response to the messaging server.

S317 to S320: The presence server sends a notification (for example, SIP NOTIFY) that carries the presence information of the multi-device messaging user to the UE1 according to the presence information subscription request, where the presence information includes device display-names of terminals UE2 . . . N.

The UE1 obtains the device display-names of terminals UE2 . . . N defined by the messaging user according to the received SIP NOTIFY message.

Certainly, if the UE1 is registered successfully, the presence information may further include the device display-name of the UE1.

The second embodiment describes the process supposing terminals UE1 . . . N belong to the same multi-device messaging user. As similar to the preceding process, other messaging users may send a SIP SUBSCRIBE request through their own requesting terminals, requesting to subscribe to the presence information of the multi-device messaging user, and obtain the presence information of the multi-device messaging user under the control of the authorization rule and notification filtering policy of the messaging user, where the presence information of the multi-device messaging user includes device display-names of terminals UE1 . . . N of the multi-device messaging user.

Third Embodiment

The third embodiment provides a method for obtaining session state information based on the presence service. In this method, the presence information published in the existing presence service is extended and a presence information element "Application specific Session Information" related to a session joined by a terminal is added to support the implementation of obtaining the session state information based on the presence service.

The added presence information element is "Application specific Session Information". The "Application specific Session Information" is added to a "service" component defined in A Data Model for Presence to indicate the ongoing session state when the messaging user joins a specific session service, and includes session-id and media type used by the session, where the media type includes audio, video and message. The "Application specific Session Information" is mapped to the presence information in the following mode:

```
<tuple>→<session-status>→<session-list>→<session-id>→
<session-media>
<basic>(video/audio/message, <session-state>and<service-description>
```

For example, the following is a specific code:

```
... ...
<op:service-description>
  <op:service-id>org.openmobilealliance:PoC-session</op:service-id>
  <op:version>1.0</op:version>
</op:service-description>
<session-status>
  <session-list>
    <session id="SessionIdentity@example.com">
      <session-media><op:basic>audio</op:basic></session-media>
      <session-state>
        <user-count>2</user-count>
        <active>true</active>
        <locked>false</locked>
      </session-state>
      <session-start-time>2007-12-05T20:07:07Z</session-start-time>
    </session>
  <session-list/>
</session-status>
... ...
```

The preceding code shows that the session-id of the ongoing session of the terminal is "SessionIdentity@example.com" and that the communication media type used in the session is audio.

Figure 4:
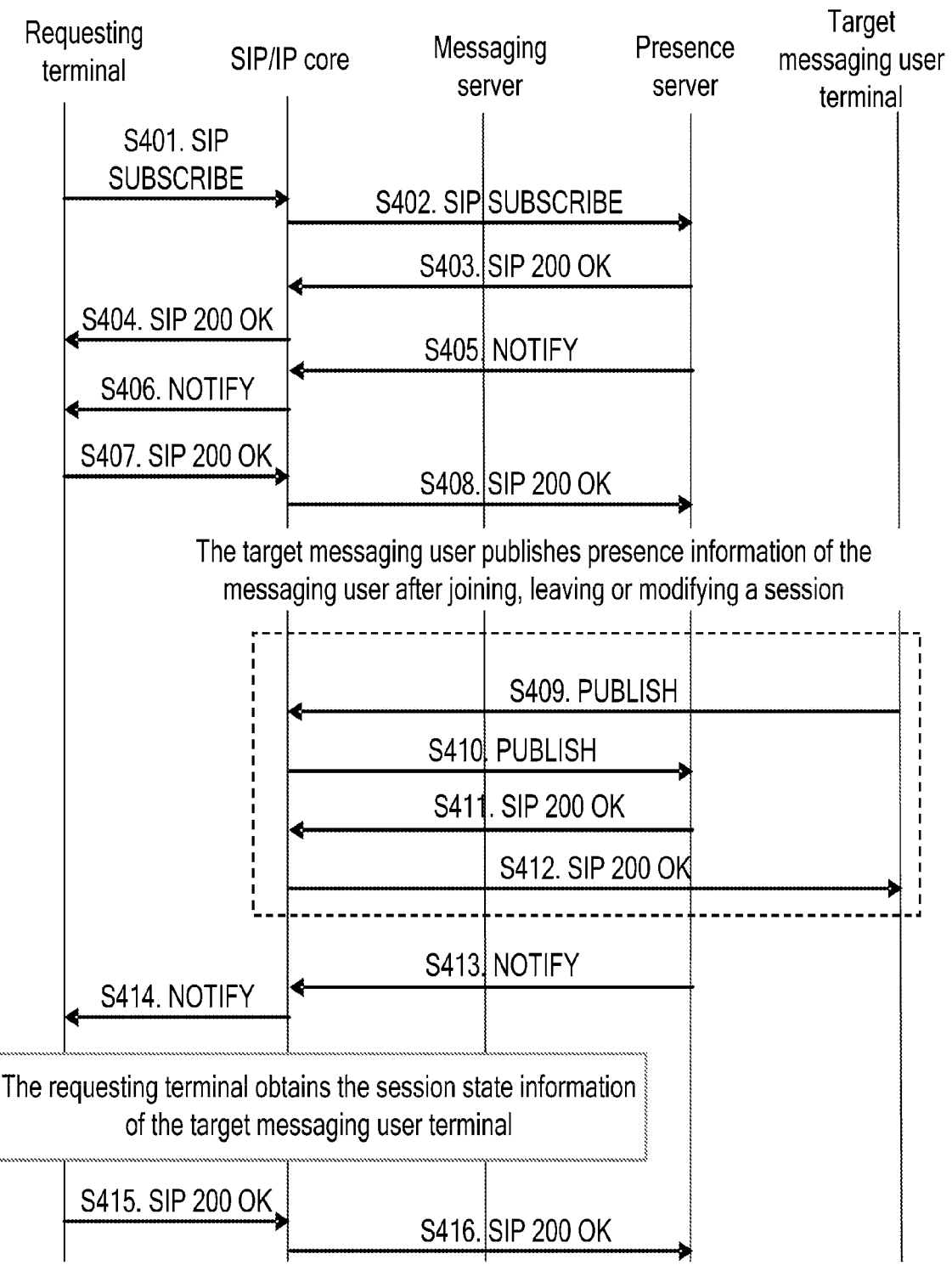
FIG. 4 is a flowchart of a method for obtaining session state information based on a presence service in a third embodiment of the invention.

The messaging user may obtain the session state information based on the presence service by extending the published presence information. FIG. 4 is a flowchart of a method for obtaining session state information based on the presence service. The following describes each entity shown in FIG. 4, supposing the multi-device messaging user requests his/her presence information through a terminal.

UE1 . . . N indicate all the terminals owned by a multi-device messaging user, and include a messaging client and a presence client. In this process, the multi-device messaging user is also a target messaging user. Terminals UE1 . . . N act as the presence information publisher to publish the presence information of the multi-device messaging user, and also act as the presence information watcher to subscribe to the presence information of the messaging user. The messaging user selects UE1 as the requesting terminal.

The SIP/IP core indicates a core network that routes SIP messages.

The messaging server is responsible for executing messaging service logic control and providing the messaging user with messaging services.

The presence server is responsible for subscribing to and publishing the presence information of the messaging user.

The specific process includes the following steps:

S401 to S408: The multi-device messaging user sends a SIP SUBSCRIBE request to the presence server through the SIP/IP core by using the UE1, requesting to subscribe to the presence information of the messaging user.

The presence server receives the SIP SUBSCRIBE request from the UE1, and returns a SIP 200 OK response to the UE1 through the SIP/IP core.

S409 to S412: During the process of using terminals UE2 . . . N, the multi-device messaging user publishes presence information when the state of a session joined by each terminal is changed as follows: The multi-device messaging user joins a service session (for example, a PoC session) by using terminals UE2 . . . N; or the multi-device messaging user updates the communication media type that is supported by the session joined by the multi-device messaging user by using terminals UE2 . . . N, for example, from txt to voice; or the multi-device messaging user leaves a service session by using terminals UE2 . . . N.

In one embodiment of the present invention, the messaging client or presence client in terminals UE2 . . . N may act as the presence source to send a SIP PUBLISH message to the presence server through the SIP/IP core, requesting to publish the presence information of the messaging user. The presence information includes session state information of terminals UE2 . . . N, where the session state information includes a list of ongoing sessions in the terminals and communication media types used by the sessions. If the presence client acts as the presence source, the session state information of the terminal needs to be obtained from the messaging client.

The presence server receives the presence information published by the terminals, and associates the presence information with the ID of the multi-device messaging user, and stores the presence information of the messaging user published by terminals UE2 . . . N. Then, the presence server returns a SIP 200 OK response to terminals UE2 . . . N through the SIP/IP core.

In another embodiment of the present invention, during the process of using terminals UE2 . . . N by the multi-device messaging user, when the states of sessions joined by terminals are changed, the home messaging server of the terminals replaces terminals UE2 . . . N to send a SIP PUBLISH message to the presence server through the SIP/IP core, requesting to publish the presence information of the messaging user, where the presence information includes session state information of terminals UE2 . . . N.

The presence server receives the presence information published by the messaging server, associates the presence information with the multi-device messaging user ID, stores the presence information published by the messaging server, and returns a SIP 200 OK response to the messaging server through the SIP/IP core.

S413 to S416: The presence server authorizes the subscription and controls the presence information delivery according to the presence information authorization rule and notification filtering policy of the messaging user. In this embodiment, the presence server sends a notification (for example, SIP NOTIFY) that carries the presence information of the multi-device messaging user to the UE1 through the SIP/IP core, where the presence information includes session state information of terminals UE2 . . . N.

The UE1 obtains the session state information of terminals UE2 . . . N from the presence information of the multi-device messaging user according to the received SIP NOTIFY message, and returns a SIP 200 OK response to the presence server through the SIP/IP core.

Certainly, if the UE1 joins a session, the presence information of the multi-device messaging user further includes session state information of the UE1.

The UE1 may present the presence information of a multi-device messaging user to the multi-device messaging user locally. The multi-device messaging user may determine which terminal is used to establish a new session or to transfer an ongoing session from one terminal to another terminal according to the session state information of each terminal.

If the presence information of the multi-device messaging user includes the device display-name of each terminal and session state information in each terminal, the messaging user may easily identify and differentiate the terminals according to the device display-names, and perform session control according to the session state information in each terminal.

The first, second and third embodiments describe how to obtain the device information of user terminals based on the presence service in the communication system. The technical solution of the invention is also applicable to the Communication Service Function entity that executes communication service logic. The actual communication service may include the message communication service, voice communication service and video communication service. The following describes the message communication service type in detail in the fourth, fifth and sixth embodiments based on the message Communication Service Function entity entity. With regard to the other communication service types, for example, voice over IP (VoIP) in the voice communication service and video telephony and video streaming in the video communication service, the voice server or video server that executes specific communication service logic may also send the device information of the target user to a requesting terminal according to a device information obtaining request or a device information publish service setting. This may be implemented according to what is disclosed herein for those skilled in the art, and will not be further described.

Fourth Embodiment

The stateful messaging server may obtain the device display-name of each terminal during the terminal registration process described in the second embodiment. In addition, after the terminals are registered, the terminals may publish their device display-name and/or device capability information to the messaging server, and the message server may obtain and store the session state information when the state of sessions joined by the UE is changed. Thus, based on the embodiment shown in FIG. 1a, the stateful messaging server may associate the information with the user ID and store the obtained device display-name and/or device capability information and session state information of the terminals as the user device information. In addition, the stateful messaging server acts as the messaging service application entity to send the messaging user device information to the requesting terminal according to the device information obtaining request.

Figure 5A:
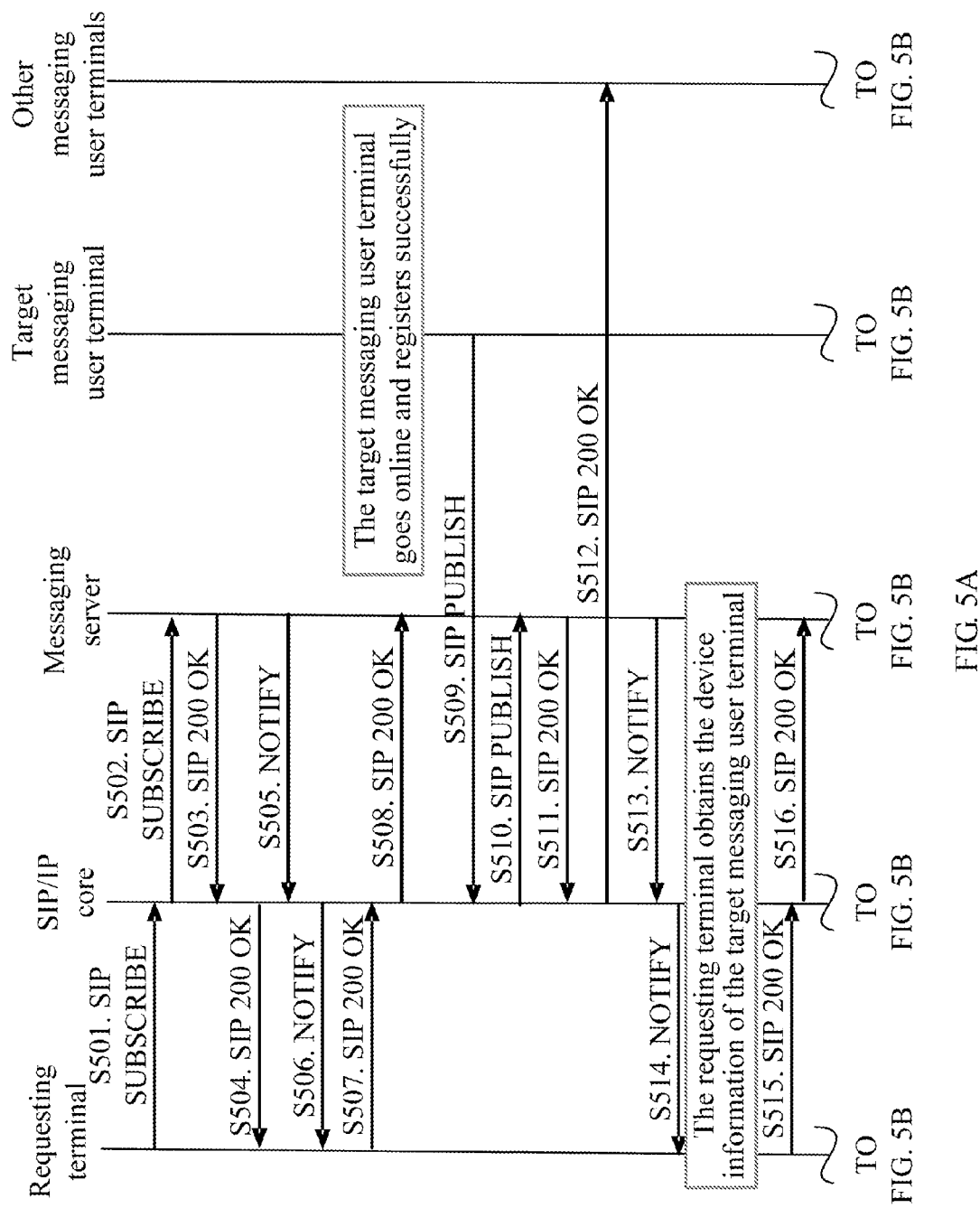
FIG. 5A-B is a flowchart of a method for returning device information by a messaging server according to a SIP SUBSCRIBE request in a fourth embodiment of the invention.
Figure 5B:
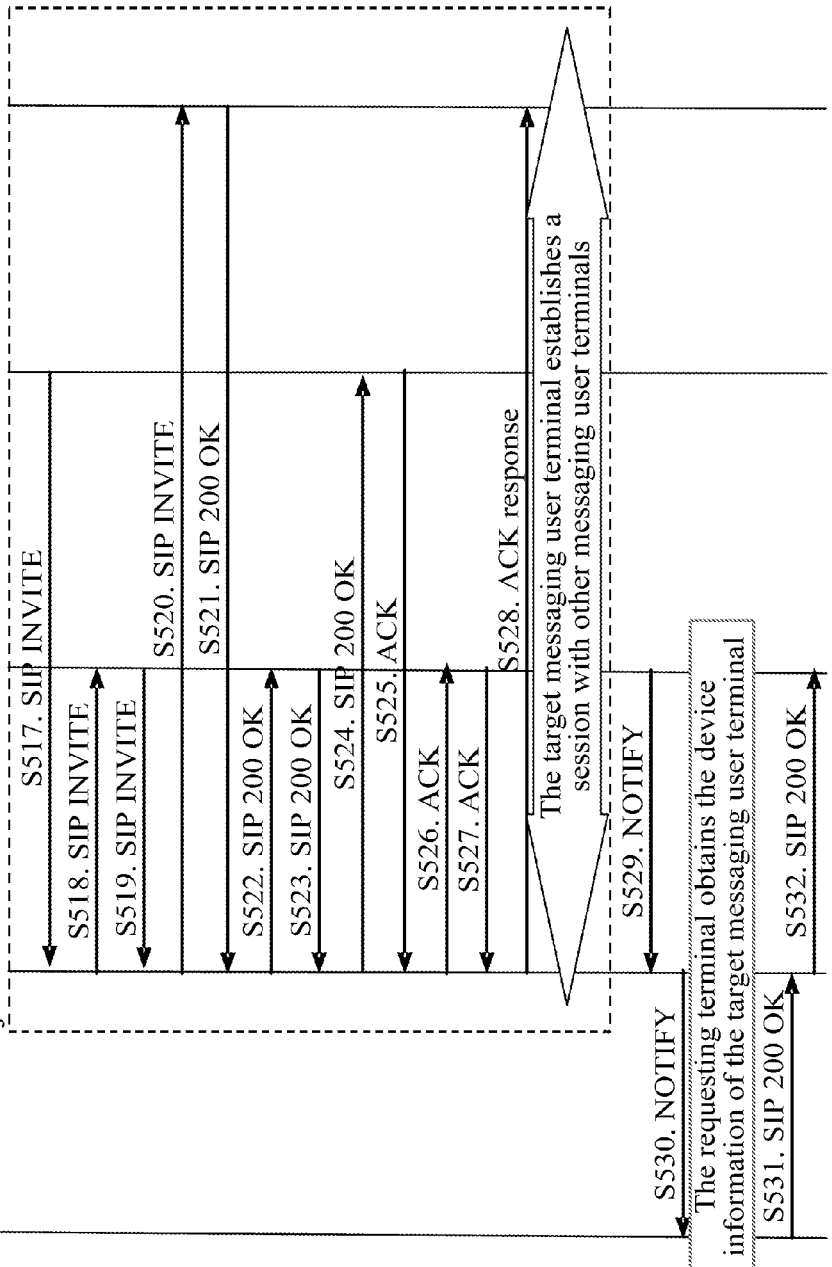

FIG. 5A-B is a flowchart of a method for returning device information by a messaging server according to a SIP SUBSCRIBE request. The following describes each entity shown in FIG. 5A-B.

UE1 . . . N indicate terminals used by a multi-device messaging user; Other UE indicates terminals used by other messaging users.

The SIP/IP core indicates a core network that routes SIP messages.

The messaging server is a stateful messaging server, for example, an instant messaging server and a converged messaging server, and is responsible for executing messaging service logic control and providing services for the messaging user.

In this embodiment, the multi-device messaging user is both a subscription messaging user and a target messaging user; the UE1 is the requesting terminal; terminals UE2 . . . N are other terminals of the multi-device messaging user; the messaging server is the Communication Service Function entity entity.

The specific process includes the following steps:

S501 to S504: The multi-device messaging user sends a device information obtaining request (for example, SIP SUBSCRIBE) to the messaging server through the SIP/IP core by using the UE1, requesting to subscribe to the device information of terminals UE2 . . . N of the messaging user, including session state information of terminals UE2 . . . N; the messaging server receives the SIP SUBSCRIBE request from the UE1, and returns a SIP 200 OK response to the UE1 through the SIP/IP core.

The device information obtaining request includes indication information defined for subscribing the device information. For example, the "Event" header field in the SIP SUBSCRIBE request is a newly defined event type: "Device-Status" event package, in which the session states of related devices carried in the returned SIP NOTIFY message body are defined. The following table lists information at least included in the "Device-Status" event package.

TABLE 1

Definition of elements in the device-status message body

| | Description |
|---|---|
| device-status | Root element of the terminal state information |
| session-list | Session list element in a terminal |
| session | Information of a session performed in a terminal, including session ID, session state, session media type, number of participants and session start time |
| device-displayname | Display-name of a terminal where the session is held |
| device-capability | Capability information of a terminal where the session is held |
| timestamp | Start time of a session in a terminal |

The messaging server determines whether to accept the session state information obtaining requests of terminals UE2 . . . N of the multi-device messaging user according to a local subscription notification and authorization policy. In this embodiment, with respect to the "Device-Status" event package, the local subscription notification and authorization policy are defined as follows: accepting the session state information obtaining requests of devices between all different terminals of the multi-device messaging user.

When the subscription messaging user and the target messaging user are not the same, as for the session state information obtaining request sent by the requesting terminal of the subscription messaging user, it is determined through a predefined access control list or through real-time interactions with the target messaging user, according to the actual session service setting.

According to the defined local subscription notification and authorization policy, in this embodiment, the request is to obtain the session state information of devices between all different terminals of the multi-device messaging user. Thus, the messaging server accepts the SIP SUBSCRIBE request from the UE1, and returns a SIP 200 OK response to the UE1 through the SIP/IP core.

S505 to S508: The messaging server sends an initial SIP NOTIFY message that carries the subscription state and validity period to the UE1 through the SIP/IP core; the UE1 returns a SIP 200 OK response to the messaging server through the SIP/IP core.

S509 to S512: Upon registration, a UE of terminals UE2 . . . N of the multi-device messaging user publishes terminal device information (for example, SIP PUBLISH) to the messaging server, with the content type in the message body meeting the previously defined "Device-Status" event package. That is, the message body carries terminal device information, which includes device display-name and/or device capability information defined by the multi-device messaging user. The messaging server obtains the device display-name and/or device capability information of the terminal from the PUBLISH message, associates the device display-name and/or device capability information of the terminal with the terminal ID, and stores it as the terminal device information of the multi-device messaging user. Then, the messaging server returns a SIP 200 OK response to terminals UE2 . . . N through the SIP/IP core.

Similarly to steps S509-S512, if the device display-name of a terminal in terminals UE2 . . . N is re-defined by the user or the device capability of a terminal in terminals UE2 . . . N is changed, the terminal re-publishes the changed device information to the messaging server.

Alternatively, the messaging server may obtain the device capability information of a terminal through a terminal capability server. To achieve this purpose, the messaging server sends a terminal device capability obtaining request to the terminal capability server after the terminals UE2 . . . N are registered, where the request carries a terminal ID and a set of device capability attributes to be returned; the terminal capability server searches for locally buffered device capability information or sends a device capability search request to the target terminal according to the request. The terminal capability server constructs a terminal device capability search response according to the search result, and returns the response to the messaging server. The messaging server obtains the device capability information of terminals UE2 . . . N from the search response returned by the terminal capability server.

S513 to S516: The messaging server sends a SIP NOTIFY message to the UE1 of the multi-device messaging user according to the device information subscription requests of terminals UE2 . . . N, notifying the device information defined in the "Device-Status" event package. Thereof, the UE1 obtains the latest device display-name and/or device capability information of online terminals in terminals UE2 . . . N.

S517 to S528: When the state of a session joined by a UE in terminals UE2 . . . N of the multi-device messaging user is changed, and after a new session channel is established in the UE, the stateful messaging server obtains the session state information in the UE, associates the session state information with the multi-device messaging user ID, and stores the session state information in the UE into the device information of the multi-device messaging user.

The state change of the session joined by the terminal includes the following cases:

(1) The messaging user joins a service session successfully by using a terminal.

(2) The messaging user updates the communication media type that is supported by a session service joined by the messaging user by using a terminal.

(3) The messaging user leaves a service session by using a terminal.

The preceding session state changes may be requested by a terminal of the messaging user or by other terminals joining the session. This embodiment supposes that the UE of the multi-device messaging user requests to establish a session with the Other UE. The UE initiates a SIP INVITE message to the Other UE through the SIP/IP core and the messaging server; the Other UE returns a SIP 200 OK response; the UE sends an ACK message to the Other UE through the SIP/IP core and the messaging server. In this case, a new session channel is established between the UE and Other UE.

After a new session channel is established between the UE and the Other UE, the stateful messaging server stores the session state information in the device, including the ID of a terminal joining a session, service type of an ongoing session (for example, a PoC Session), version information, session start time, number of participants, and communication media type and encoding format used in a session. If the messaging user defines a device display-name for each terminal, the session state information also includes a device display-name of a terminal where the session is held.

S521 to S524: The messaging server generates a SIP NOTIFY message that carries the device information of the multi-device messaging user according to the received SIP SUBSCRIBE request specific to the "Device-Status" event package, and sends the SIP NOTIFY message to the UE1 through the SIP/IP core. The device information of the multi-device messaging user includes the device display-name and/or device capability information of terminals UE2 . . . N and state information of sessions joined by terminals UE2 . . . N, where the session state information includes a list of ongoing sessions in terminals and a communication media type used during the session.

The UE1 receives the SIP NOTIFY message, and obtains the device information of terminals UE2 . . . N of the multi-device messaging user, including device display-name and/or device capability information of terminals UE2 . . . N and state information of sessions joined by terminals UE2 . . . N. Then, the UE1 returns a SIP 200 OK response to the messaging server through the SIP/IP core.

In the preceding process, the subscription notification frequency of the UE1 may be controlled according to the requirement of the messaging user. For example, the UE1 is instructed to send a request to obtain possible session state information in terminals UE2 . . . N only when the messaging user hopes to transfer sessions from terminals UE2 . . . N to the UE1. In this case, the "Expires" header field of the SIP SUBSCRIBE request is zero. If the "Expires" header field is non-zero, the messaging server needs to notify the UE1 of changed session state information when the session state information in terminals UE2 . . . N is changed within the validity period specified in the "Expires" header field. Specifically, all the device information or only changed session state information of terminals of the multi-device messaging user may be sent to the UE1 for update.

The process of obtaining device information between different messaging users is similar, and will not be further described.

In this embodiment, the messaging user obtains the device information of other terminals of the messaging user from the messaging server through the requesting terminal, where the device information of other terminals includes session state information in each terminal. The messaging user may perform session control according to the session state information in each terminal.

Referring to steps S313 to S316 in the second embodiment, the messaging server may obtain the device display-names of terminals UE2 . . . N, and add the device display-names to the device information that is sent to the UE1.

Because the device display-names defined by the messaging user are stored in the terminals, each terminal of the target messaging user may also obtain the session state information locally. Thus, the target messaging user terminal may also act as the Communication Service Function entity to process the device information obtaining request according to the embodiment shown in FIG. 1a. The messaging server forwards the device information obtaining request to the target messaging user terminal; the target messaging user terminal sends the device information to the requesting terminal directly. For the specific embodiment, refer to the fifth embodiment.

Fifth Embodiment

Figure 6A:
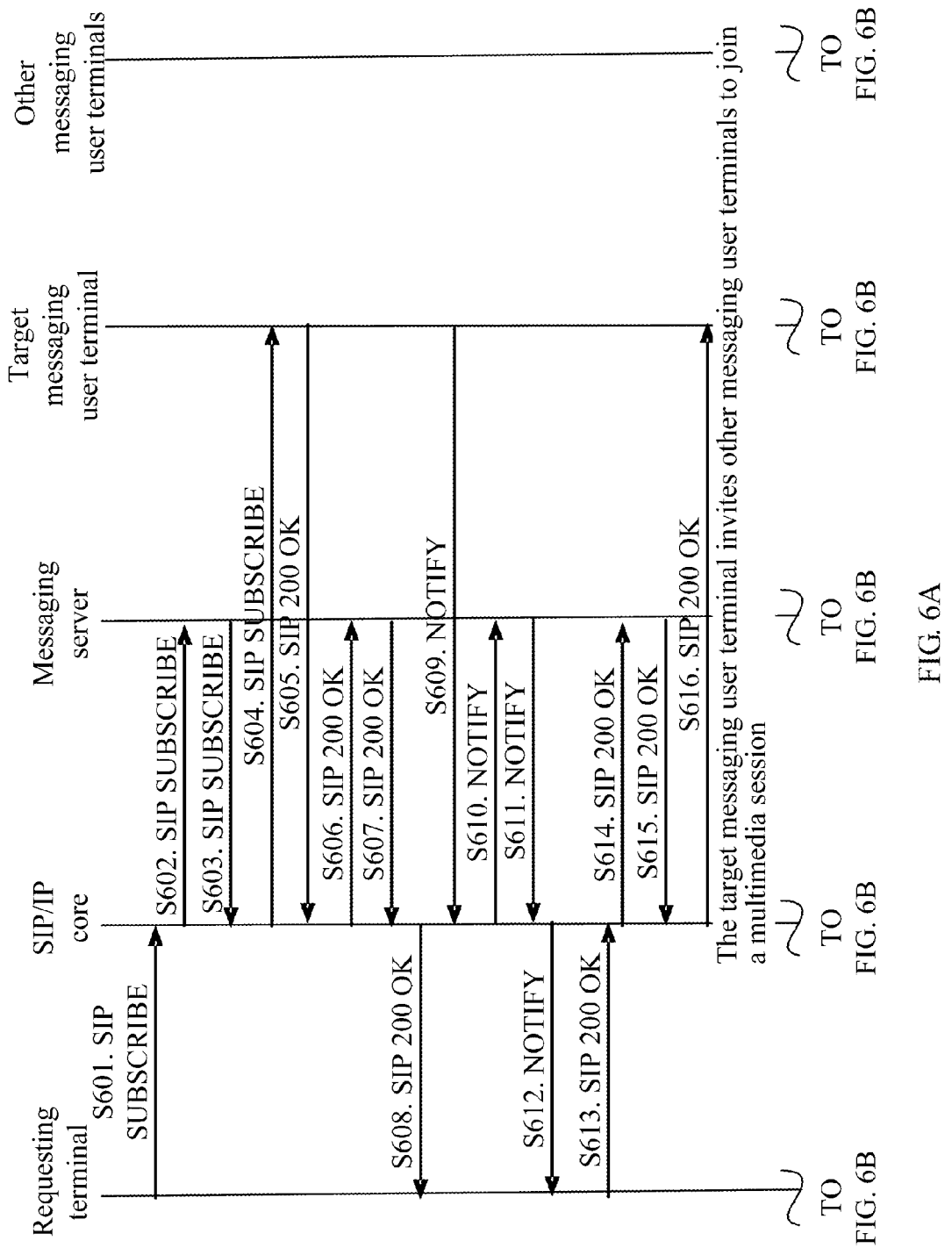
FIG. 6A-B is a flowchart of a method for obtaining device information based on a SIP REGISTER request in a fifth embodiment of the invention.
Figure 6B:
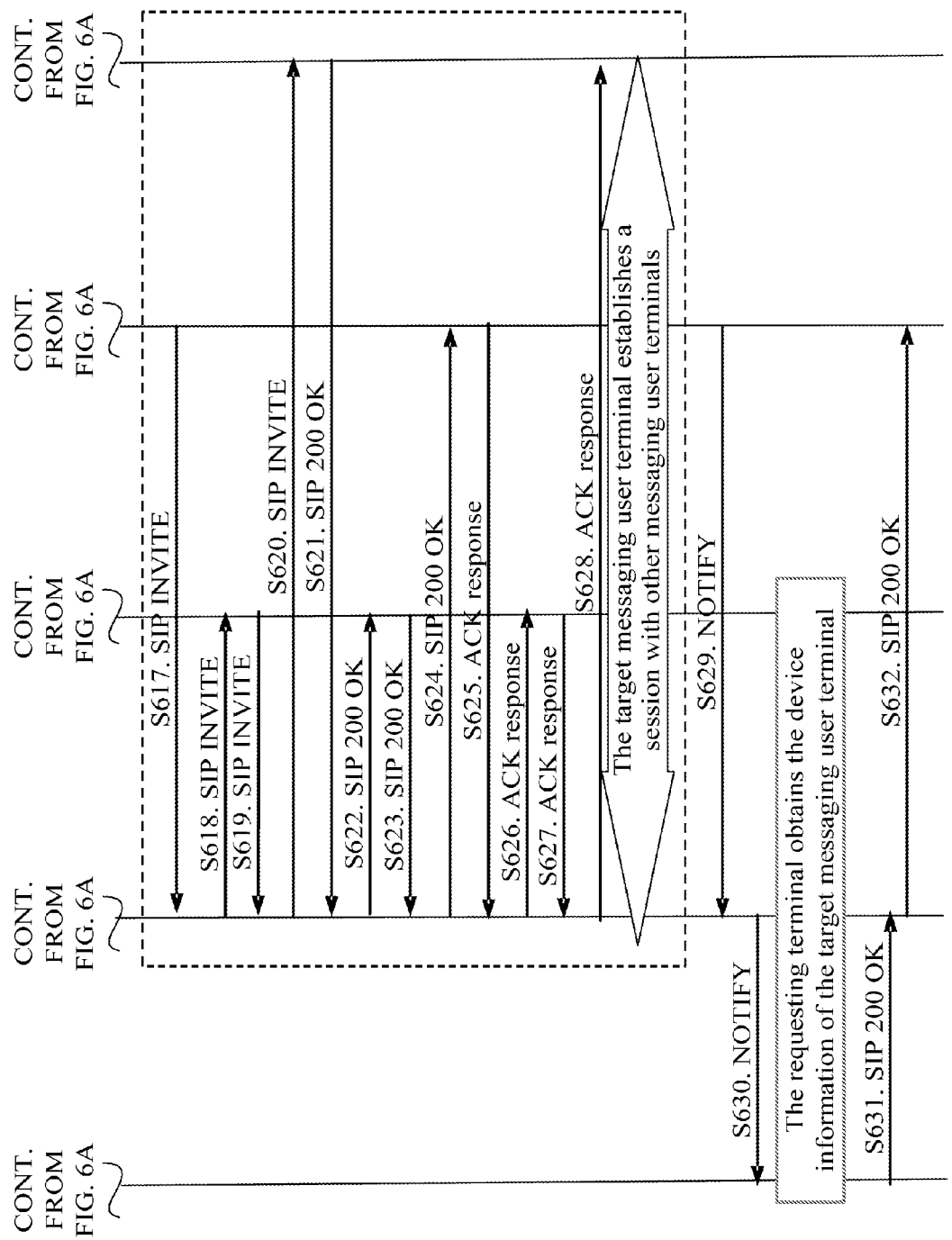

FIG. 6A-B is a flowchart of returning device information by the messaging server according to a SIP obtaining request. The following describes each entity shown in FIG. 6A-B.

UE1 . . . N indicate terminals used by a multi-device messaging user; Other UE indicates terminals used by other messaging users.

The SIP/IP core indicates the core network that routes SIP messages.

The messaging server is a stateless messaging server, and is responsible for executing messaging service logic control and providing services for the messaging user.

In this embodiment, the multi-device messaging user is both a subscription messaging user and a target messaging user; UE1 is the requesting terminal; and terminals UE2 . . . N are other terminals of the multi-device messaging user and also the Communication Service Function entity.

The process includes the following steps:

S601 to S608: The multi-device messaging user sends a SIP SUBSCRIBE request to the messaging server through the SIP/IP core by using the UE1, requesting to subscribe to session state information in devices of other terminals UE2 . . . N of the messaging user; the messaging server forwards the received SIP SUBSCRIBE request to other terminals UE2 . . . N of the multi-device messaging user; terminals UE2 . . . N accept the SIP SUBSCRIBE request from the UE1, and return a SIP 200 OK response to the UE1 through the messaging server and the SIP/IP core.

The SIP SUBSCRIBE request carries indication information defined for subscribing the device information. For example, the "Event" header field is a newly defined event type: "Session" event package. The local subscription notification and authorization policy is defined as follows: accepting the session state information obtaining requests in devices between all different terminals of the multi-device messaging user.

When the subscription messaging user and the target messaging user are not the same, as for the session state information obtaining request sent by the requesting terminal of the subscription messaging user, it is determined through a predefined access control list or through real-time interactions with the target messaging user according to the actual session service setting.

Terminals UE2 . . . N determine whether to accept the session state information obtaining request of the local terminal according to the local subscription notification and authorization policy. In this embodiment, the request is to obtain the session state information in devices between all different terminals of the multi-device messaging user. Thus, terminals UE2 . . . N accept the SIP SUBSCRIBE request from the UE1, and return a SIP 200 OK response to the UE1 through the messaging server and the SIP/IP core.

S609 to S616: Terminals UE2 . . . N send an initial SIP NOTIFY message that carries the subscription state and validity period to the UE1 through the messaging server and the SIP/IP core; the UE1 returns a SIP 200 OK response to terminals UE2 . . . N.

S617 to S628: When the state of a session joined by one of terminals UE2 . . . N of the multi-device messaging user is changed, and after a new session channel is established in the UE, the UE obtains the local session state information, associates such information with the user ID, and stores it in the device information of the messaging user.

The state change of the session joined by the terminal of the messaging user includes the following cases:

(1) The messaging user joins a service session successfully by using the terminal.

(2) The messaging user updates the communication media type that is supported by a session service joined by the messaging user by using the terminal.

(3) The messaging user leaves a service session by using the terminal.

The preceding session state changes may be requested by a terminal of the messaging user or by other terminals joining the session. This embodiment supposes that the UE of the multi-device messaging user requests to establish a session with the Other UE. The UE initiates a SIP INVITE message to the Other UE through the SIP/IP core and the messaging server; the Other UE returns a SIP 200 OK response; the UE sends an ACK message to the Other UE through the SIP/IP core and the messaging server. In this case, a new session channel is established between the UE and the Other UE.

After a new session channel is established between the UE and the Other UE, the UE stores the session state information in devices locally, including the ID of a UE joining the session, device display-name of the UE defined by the messaging user, service type of the ongoing session (for example, a PoC Session), version information, session start time, number of participants, and communication media type and encoding format used in the session.

S629 to S632: The multi-device messaging user generates a SIP NOTIFY message that carries the device information according to the received SIP SUBSCRIBE request specific to the "Session" event package, and sends the SIP NOTIFY message to the UE1 through the SIP/IP core. The device information includes session state information of terminals UE2 . . . N of the multi-device messaging user, where the session state information includes a list of ongoing sessions in the terminal and a communication media type used during the session.

The UE1 obtains the device information of terminals UE2 . . . N of the multi-device messaging user according to the received SIP NOTIFY message, and returns a SIP 200 OK response to terminals UE2 . . . N through the SIP/IP core.

In this embodiment, the UE1 receives device information from other terminals, and summarizes the received device information into the device information of the multi-device messaging user in the local terminal.

Each of terminals UE2 . . . N may also obtain the device display-name defined by the messaging user from the local storage information, and add the obtained device display-name to the device information that is sent to the UE1.

In this embodiment, the messaging server may also store the device information into a network storage entity. Thus, the network storage entity may also act as the Communication Service Function entity to process the device information obtaining request based on the embodiment shown in FIG. 1a, and send the device information metadata to the requesting terminal; the requesting terminal obtains the device information according to the device information metadata. For the specific implementation mode, refer to the sixth embodiment.

Sixth Embodiment

The sixth embodiment provides a method for obtaining device information based on the network storage entity, in which the messaging server stores the device information into the network storage entity; and the user obtains the device information from the network storage entity through the requesting terminal.

Figure 7A:
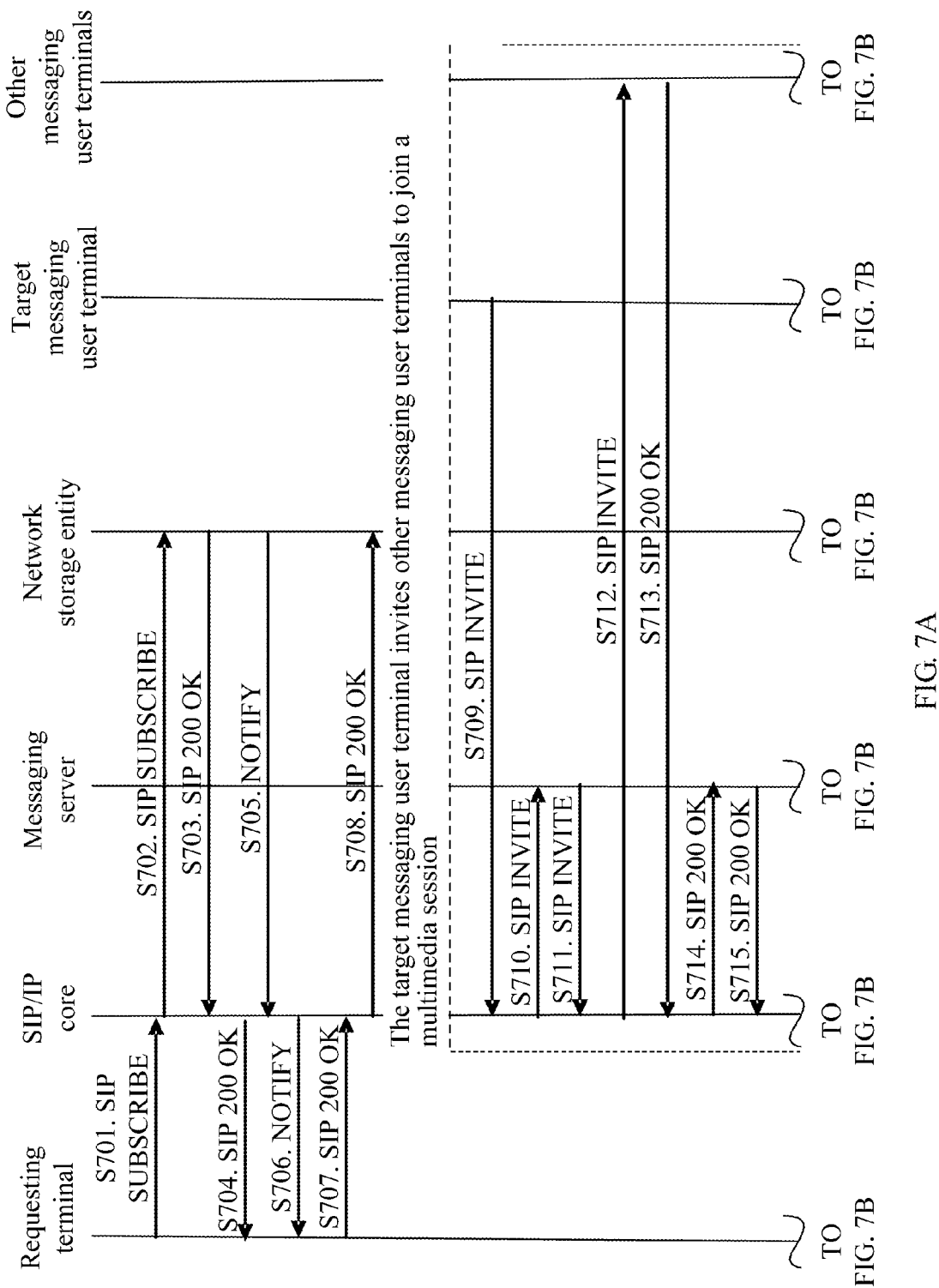
FIG. 7A-B is a flowchart of a method for obtaining device information according to network storage in a sixth embodiment of the invention.
Figure 7B:
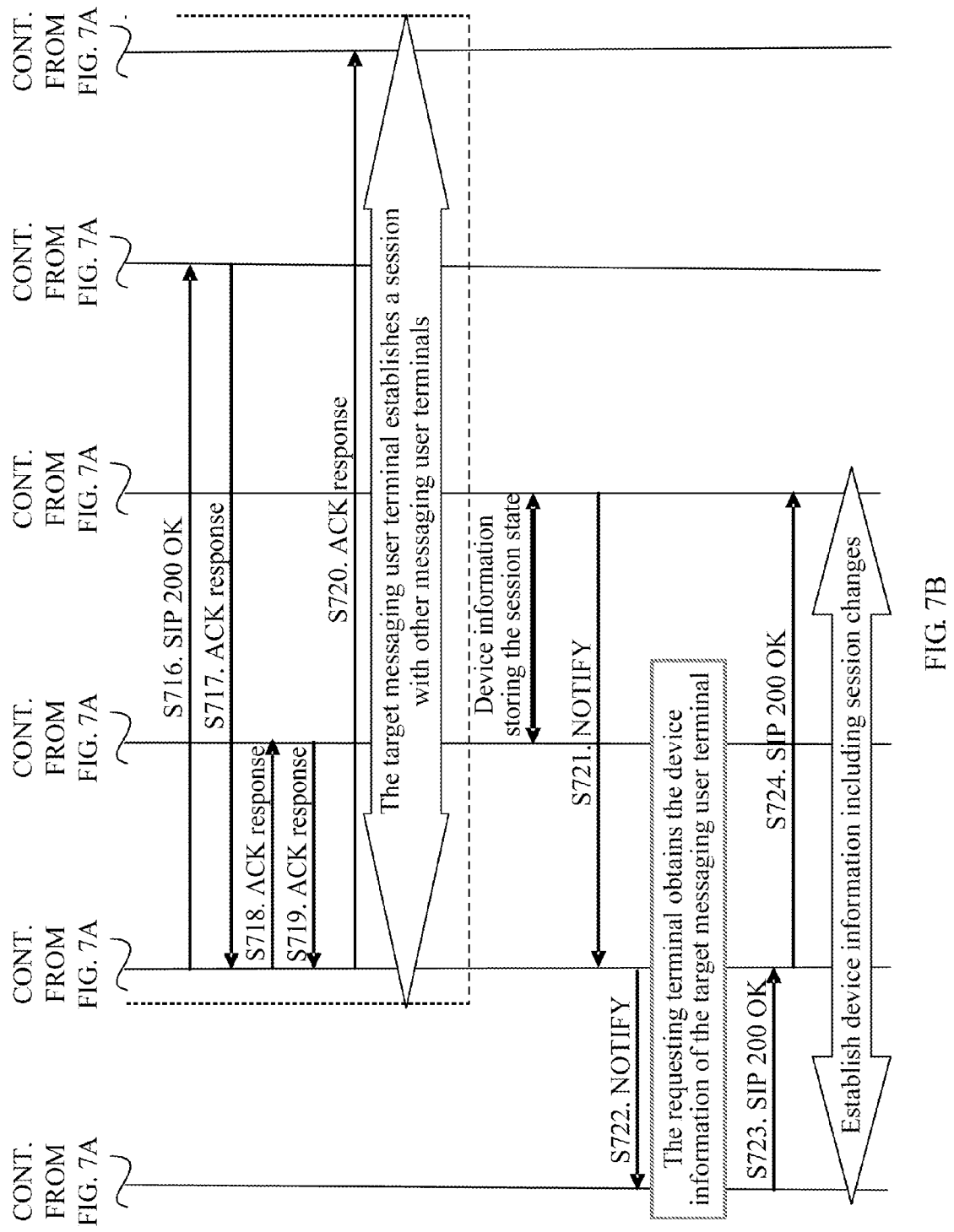

FIG. 7A-B is a flowchart of a method for obtaining device information according to the network storage. The following describes each entity shown in FIG. 7A-B.

UE1 . . . N indicate terminals used by a multi-device messaging user; Other UE indicates terminals used by other messaging users.

The SIP/IP core indicates the core network that routes SIP messages.

The messaging server is responsible for executing messaging service logic control and providing services for the messaging user.

The network storage is located in the home network of terminals UE1 . . . N, and adapted to store messaging service metadata and actual communication contents.

In this embodiment, the multi-device messaging user is both a subscription messaging user and a target messaging user; UE1 is the requesting terminal; terminals UE2 . . . N are other terminals of the multi-device messaging user; and the network storage entity is the Communication Service Function entity entity.

Referring to steps S313 to S316 in the second embodiment, in this embodiment, the messaging server may obtain the device display-names of terminals UE2 . . . N, and store them in the network storage entity.

The process includes the following steps:

S701 to S704: The multi-device messaging user sends a SIP SUBSCRIBE request to the network storage entity through the SIP/IP core, requesting to subscribe to the session state information in devices of terminals UE2 . . . N of the messaging user in the network storage entity; the network storage entity accepts the SIP SUBSCRIBE request from the UE1, and returns a SIP 200 OK response to the UE1 through the SIP/IP core.

The SIP SUBSCRIBE request carries indication information defined for obtaining the device information. For example, the "Event" header field is defined as "ua-profile". In addition, parameters "auid" and "document" indicate the application usage ID of XML Configuration Access Protocol (XCAP) resources and the messaging service metadata document (XUI) in the network storage entity respectively.

The network storage entity determines whether to accept the device information obtaining requests of terminals UE2 . . . N of the multi-device messaging user according to the local subscription notification and authorization policy. The local subscription notification and authorization policy is defined as follows: accepting the device information obtaining requests in devices between all different terminals of the multi-device messaging user.

When the messaging user who sends a request and the target messaging user are not the same, as for the device information obtaining request sent by the requesting terminal, it is determined through a predefined access control list or through real-time interactions with the target messaging user according to the actual session service setting.

According to the defined local subscription notification and authorization policy, in this embodiment, the request is to obtain the device information in devices between all different terminals of the multi-device messaging user. Thus, the network storage entity accepts the request, and returns a SIP 200 OK response to the UE1 through the SIP/IP core.

S705 to S708: The network storage entity sends an initial SIP NOTIFY message that carries the subscription state and validity period to the UE1 through the SIP/IP core; the UE1 returns a SIP 200 OK response to the network storage entity through the SIP/IP core.

S709 to S720: When the state of a session joined by a UE of terminals UE2 . . . N of the multi-device messaging user is changed, and after a new session channel is established in the UE, the stateful messaging server obtains the session state information in the terminal, initiates a device information network storage request according to the messaging user service setting, and stores the session state information in the UE into the network storage entity.

Or, the UE of the messaging user obtains the session state information in the terminal, initiates a device information network storage request, and stores the session state information in the UE into the network storage entity.

The state change of the session joined by the terminal includes the following cases:

(1) The messaging user joins a service session successfully by using a terminal.

(2) The messaging user updates the communication media type that is supported by a session service joined by the messaging user by using a terminal.

(3) The messaging user leaves a service session by using a terminal.

The preceding session state changes may be requested by a terminal of the messaging user or by other terminals joining the session. This embodiment supposes that the UE of the multi-device messaging user terminal requests to establish a session with the Other UE. The UE initiates a SIP INVITE message to the Other UE through the SIP/IP core and the messaging server; the Other UE returns a SIP 200 OK response; the UE sends an ACK message to the Other UE through the SIP/IP core and the messaging server. In this case, a new session channel is established between the UE and the Other UE.

After a new session channel is established between the UE of the messaging user and the Other UE of other messaging users, the stateful messaging server initiates a device information network storage request according to the messaging user service setting, and stores the session state information in the UE into the network storage entity.

Or, after a new session channel is established between the UE of the messaging user and the Other UE of other messaging users, the UE of the messaging user initiates a device information network storage request, and stores the session state information in the UE into the network storage entity.

S721 to S724: The network storage entity generates messaging service metadata that is specific to the device information of terminals UE2 . . . N of the messaging user according to the SIP SUBSCRIBE request, and sends a SIP NOTIFY message that carries the messaging service metadata to the UE1 through the SIP/IP core.

The UE1 of the messaging user obtains the device information of terminals UE2 . . . N of the multi-device messaging user from the network storage entity according to the messaging service metadata on the device information of terminals UE2 . . . N of the messaging user carried in the received SIP NOTIFY message.

The following describes an alternative method for the sixth embodiment: When the session state information of the device stored in the network storage entity is changed, the messaging server requests to establish a session connection with the UE1 of the messaging user to transmit the changed session state information of terminals UE2 . . . N of the messaging user; or the messaging user accesses the messaging service metadata on the device information stored in the network storage entity by using the UE1, and requests to establish a session connection with the messaging server according to the obtained messaging service metadata to transmit the changed session state information of terminals UE2 . . . N of the messaging user.

Based on the embodiment shown in FIG. 1b, the messaging server may also publish the device information of the messaging user to the terminal. For the specific embodiment, refer to the seventh embodiment.

Seventh Embodiment

Figure 8A:
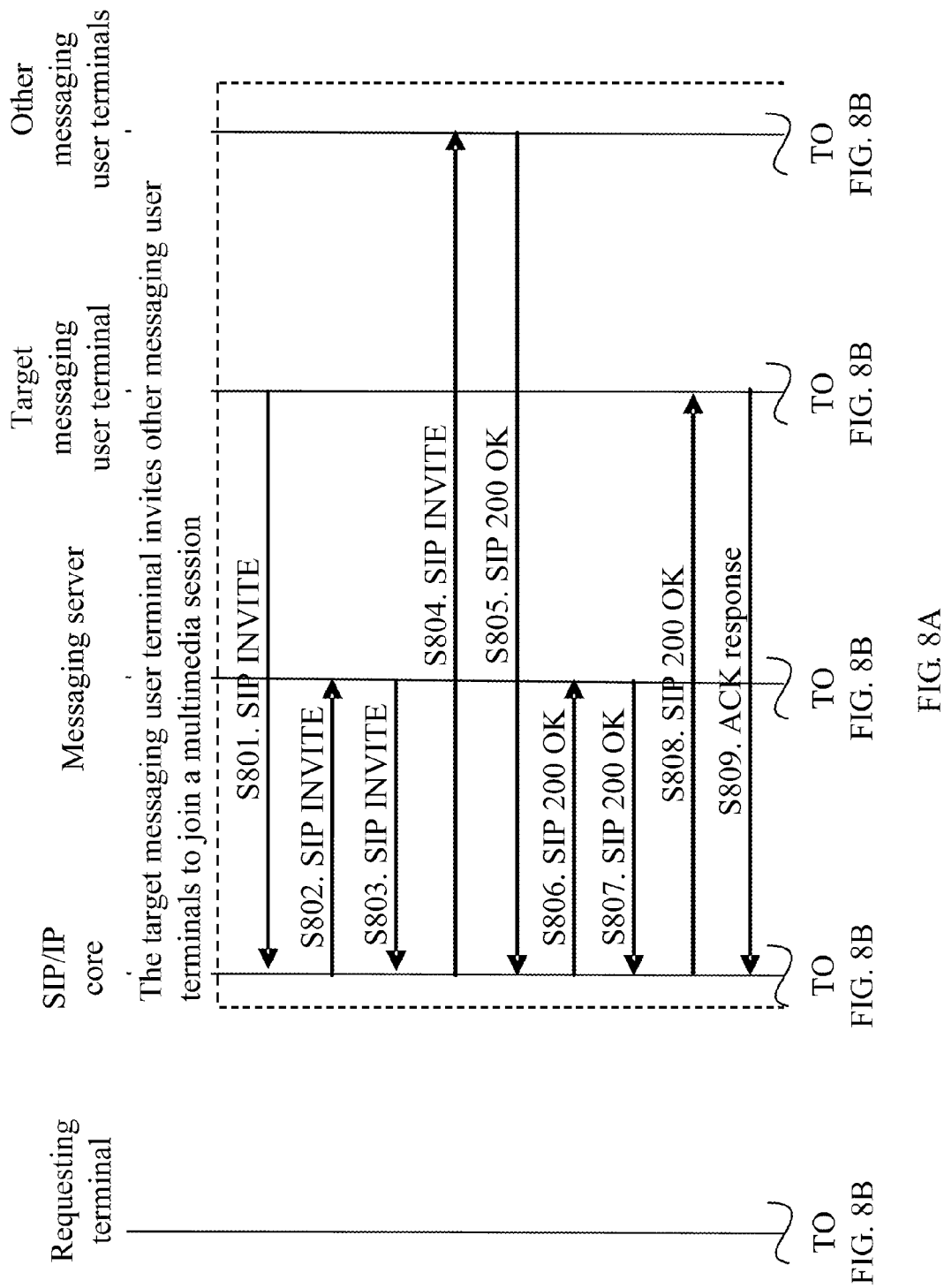
FIG. 8A-B is a flowchart of a method for publishing device information to a specified receiving terminal by the messaging server according to a device information publish service setting in a seventh embodiment of the invention.
Figure 8B:
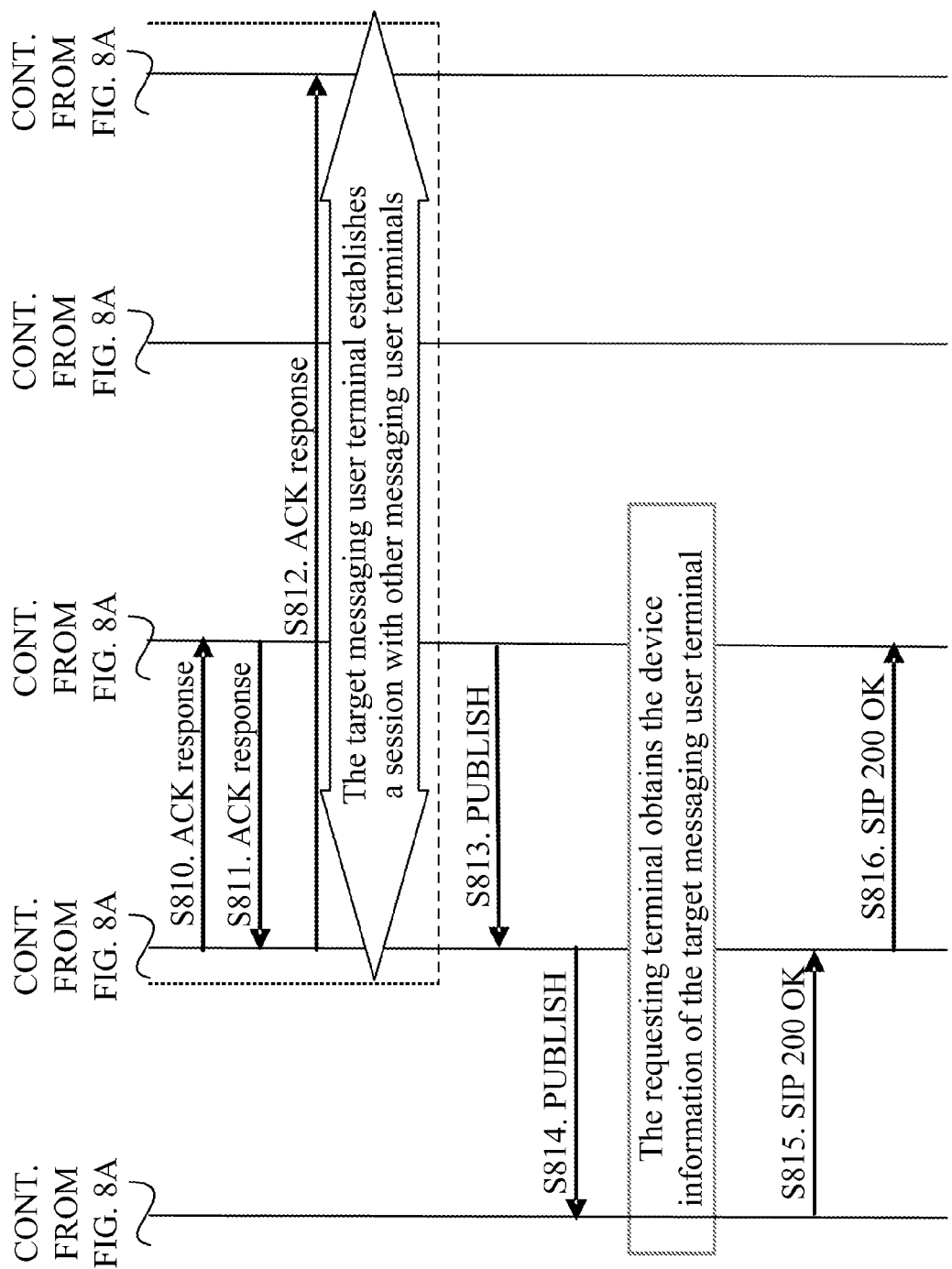

FIG. 8A-B is a flowchart of a method for publishing device information to a terminal by the messaging server. The following describes each entity shown in FIG. 8A-B.

UE1 . . . N indicate terminals used by a multi-device messaging user; Other UE indicates terminals used by other messaging users.

The SIP/IP core indicates the core network that routes SIP messages.

The messaging server is a stateful messaging server, and is responsible for executing messaging service logic control and publishing device information to the messaging user.

To publish the device information, the messaging user needs to make a device information publish service setting. The messaging server determines whether to publish the device information of the target messaging user to the requesting terminal according to the device information publish service setting of the messaging user.

Referring to steps S313 to S316 in the second embodiment, the messaging server may obtain the device display-names of terminals UE2 . . . N, associates them with the user ID, and stores them in the device information of the user.

The process of publishing device information by the messaging server includes the following steps:

S801 to S812: When the state of a session joined by one of terminals UE2 . . . N of the multi-device messaging user is changed, and after a new session channel is established in the UE, the stateful messaging server may obtain the session state information in terminals UE2 . . . N, associate such information with the user ID, and store it in the device information of the messaging user.

The state change of the session joined by the terminal includes the following cases:

(1) The messaging user joins a service session successfully by using a terminal.

(2) The messaging user updates the communication media type that is supported by a session service joined by the messaging user by using a terminal.

(3) The messaging user leaves a service session by using a terminal.

The preceding session state changes may be requested by a terminal of the messaging user or by other terminals joining the session. This embodiment supposes that the UE of the multi-device messaging user requests to establish a session with the Other UE. The UE initiates a SIP INVITE message to the Other UE through the SIP/IP core and the messaging server; the Other UE returns a SIP 200 OK response; the UE sends an ACK message to the Other UE through the SIP/IP core and the messaging server. In this case, a new session channel is established between the UE and the Other UE.

After a new session channel is established between the UE and the Other UE, the stateful messaging server stores the session state information in devices locally, including the ID of a UE joining the session, device display-name of the UE defined by the messaging user, service type of the ongoing session (for example, a PoC Session), version information, session start time, number of participants, and communication media type and encoding format used in the session.

S813 to S816: The messaging server generates a device information publish message (for example, SIP PUBLISH) that carries the device information, and sends it to the UE1 through the SIP/IP core. The device information includes device display-name and session state information of terminals UE2 . . . N, where the session state information includes a list of ongoing sessions in the terminals and a communication media type used during the session.

The UE1 obtains the device information of terminals UE2 . . . N of the multi-device messaging user according to the received SIP PUBLISH message, and returns a SIP 200 OK response to the messaging server through the SIP/IP core.

Figure 9:
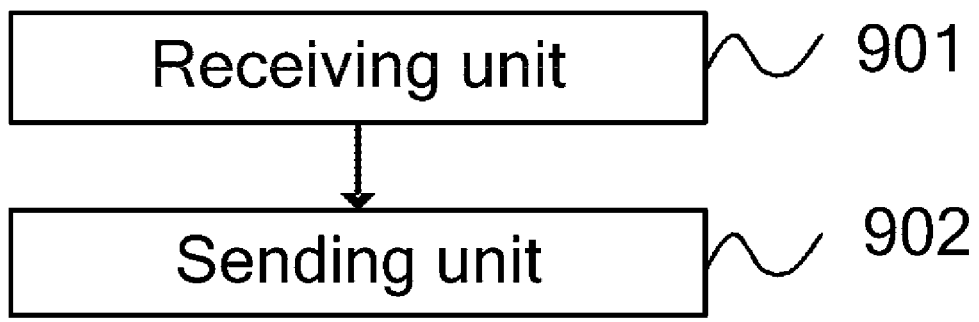
FIG. 9 and FIG. 10 show a main structure of a Communication Service Function entity in an embodiment of the invention.

As shown in FIG. 9, a Communication Service Function entity entity provided in an embodiment of the invention includes:
- a receiving unit 901, adapted to receive a device information obtaining request or a device information publish service setting; and
- a sending unit 902, adapted to send stored device information of a target user to a requesting terminal according to the target user ID carried in the device information obtaining request or device information publish service setting.

Figure 10:
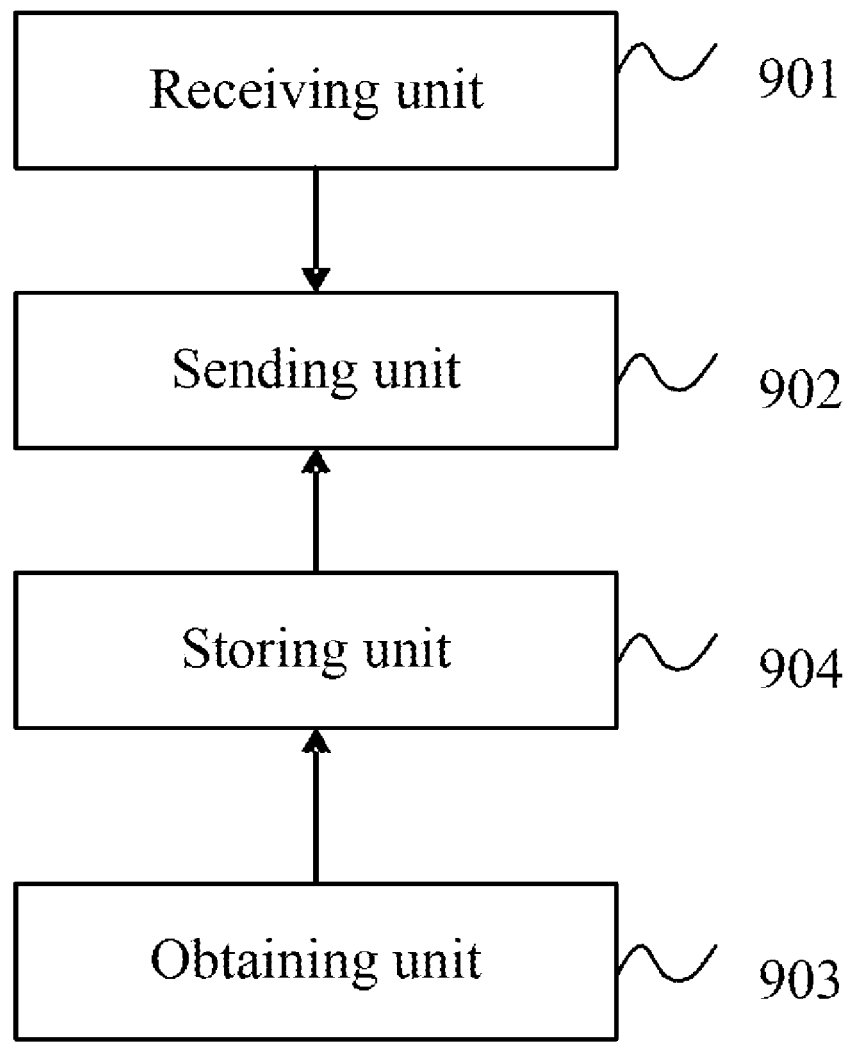

As shown in FIG. 10, the Communication Service Function entity entity provided in an embodiment of the invention may further include:
- an obtaining unit 903, adapted to obtain the device display-name and/or device capability information of the target user terminal and session state information in the terminal;
- a storing unit 904, adapted to: associate the target user ID, and store the device display-name and/or device capability information of the target user terminal and session state information in the terminal obtained by the obtaining unit 903 as the device information of the target user; and
- the sending unit 902, adapted to extract the device information of the target user from the storing unit according to the target user ID.

Figure 11:
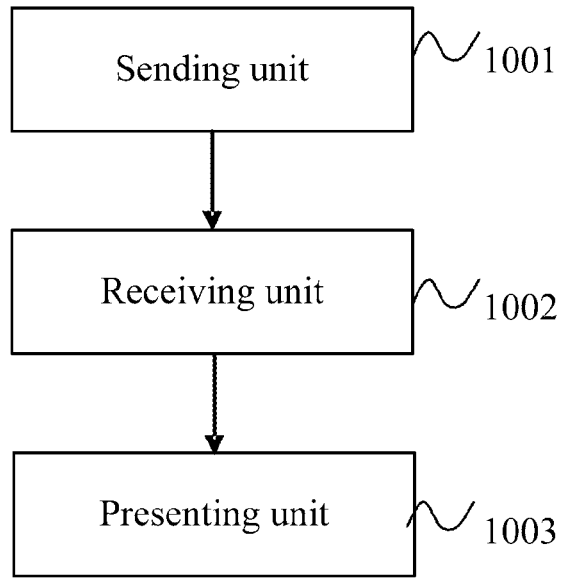
FIG. 11 shows a main structure of a communication terminal in an embodiment of the invention.

As shown in FIG. 11, a communication terminal provided in an embodiment of the invention includes:
- a sending unit 1001, adapted to send a device information obtaining request or make a device information publish service setting;
- a receiving unit 1002, adapted to receive terminal device information of a specified target user in the device information obtaining request or device information publish service setting returned by a Communication Service Function entity entity; and
- a presenting unit 1003, adapted to present the terminal device information of the target user received by the receiving unit 1002.

Figure 12:
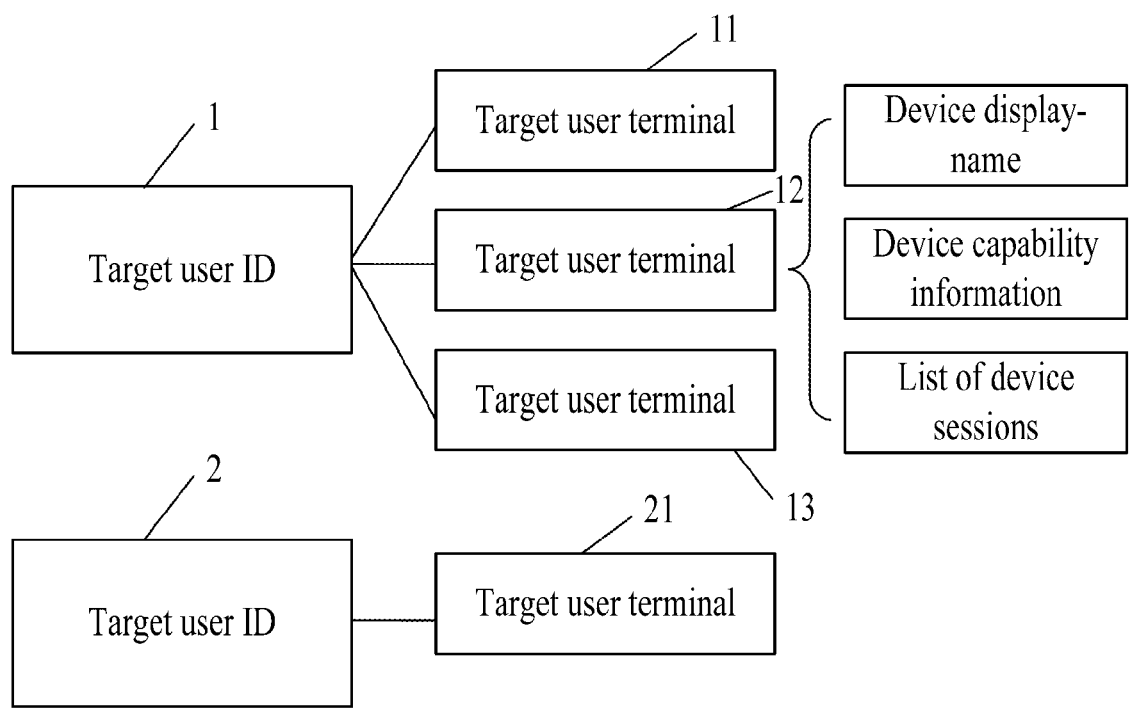
FIG. 12 is a flowchart of presenting contents by a presenting unit in a communication terminal in an embodiment of the invention.

Further, FIG. 12 shows the terminal device information of the target user presented by the presenting unit 1003 in the communication terminal in this embodiment. The terminal device information of the target user includes:
- a target user ID, adapted to differentiate registration addresses of different users or a same user, and there may be one or more target user IDs;
- a target user terminal, indicating one or multiple terminals owned by the target user;
- a device display-name, adapted to describe and differentiate device information of the target user terminal;
- device capability information, adapted to describe the device information of the target user terminal capability; and
- a list of device sessions, adapted to describe the device information of the states of ongoing sessions in the target user terminal.

In conclusion, the method for obtaining device information of user terminals and the Communication Service Function entity thereof provided in embodiments of the invention enable the user to obtain his/her own device information or device information of other users from the Communication Service Function entity through a requesting terminal. The device information may include the device display-name of each terminal, so that the user may easily identify and differentiate the terminals according to the device display-names. Or, the device information may include session state information in each terminal, so that the user may select a terminal to establish a new session according to the session state information in each terminal or may transfer an ongoing session from one terminal to the other terminal. Further, the device information may include device display-name and session state information of each terminal, so that the user may easily identify and differentiate the terminals and perform session control.

It is apparent that those skilled in the art can make various modifications and variations to the invention without departing from the spirit and scope of the invention. The invention is intended to cover such modifications and variations provided that they fall in the scope of protection defined by the following claims or their equivalents.

What is claimed is:

1. A method for obtaining device information of user's terminals in a communication system, comprising a communication service function entity performing:
   obtaining device information of a terminal of a target user, wherein the device information comprises at least a device display-name and ongoing session state information of the terminal of the target user, and the device display-name, which is defined for the user terminal by the target user;
   associating the obtained device information with a target user ID and storing the device information as target user device information;
   obtaining the ongoing session state information when a state of the on-going session joined by the target user terminal is changed;
   associating the ongoing session state information with the target user ID and storing the ongoing session state information in the device information of the target user terminal;
   in response to a device information obtaining request, sending the device information of the target user terminal to a requesting terminal according to the target user ID which is carried within the device information obtaining request, wherein the device information obtaining request is authorized according to at least one of: a presence information authorization rule and notification filtering policy of the target user, or according to a local subscription notification and authorization policy.

2. The method according to claim 1, wherein sending of the device information of the target user terminal to the requesting terminal comprises:

sending a device information notification containing the stored target user device information to the requesting terminal according to the device information obtaining request.

3. The method according to claim 1, wherein the communication service function entity is a communication service server, and the obtaining of the device display-name of the terminal of the target user comprising:

receiving, by the communication service server, user registration state information sent of the target user from a SIP/IP core when the terminal of the target user is registered, wherein the user registration state information comprises the device display-name of the terminal of the target user; and obtaining, by the communication service server, the device display-name of the terminal of the target user from the user registration state information.

4. The method according to claim 3, wherein obtaining the device display-name of the terminal of the target user comprising:

receiving, by the communication service server, the device information, wherein the device information is published by the terminal of the target user, after the terminal of the target user is registered or the device display-name of the terminal of the target user is re-defined by the target user, and the device information comprises the device display-name of the terminal of the target user; and obtaining, by the communication service server, the device display-name of the terminal of the target user from the published device information.

5. The method according to claim 3 wherein obtaining the ongoing session state information in the terminal of the target user comprising:

obtaining, by the communication service server, the ongoing session state information in the terminal of the target user from locally buffered session records when a state of a session joined by the terminal of the target user is changed.

6. The method according to claim 1, wherein the communication service function entity is a network storage located in a home network of the terminal of the target user; and the obtaining of the device information comprising:

receiving and storing, by the network storage, the device information of the terminal of the target user, wherein the device information of the terminal of the target user is obtained by a communication service server; and obtaining, by the network storage, the device information of the terminal of the target user from the storage information.

7. The method according to claim 1, wherein the communication service function entity is the terminal of the target user, and the method comprising:

obtaining, by the terminal of the target user, the device display-name from the local storage information; and obtaining, by the terminal of the target user, local ongoing session state information from the local storage information after the state of a session joined by the terminal of the target user is changed.

8. The method according to claim 1, wherein the communication service function entity is a presence server, and the method comprising:

receiving, by the presence server, user registration state information of the target user from a SIP/IP core when the terminal is registered successfully, wherein the user registration state information comprises the device display-name of the terminal of the target user; and obtaining, by the presence server, the device display-name of the terminal of the target user from the user registration state information.

9. The method according to claim 1, wherein the communication service function entity is a presence server, and the method comprising:

receiving, by a communication service server, user registration state information of the target user from a SIP/IP core when the terminal is registered successfully, wherein the user registration state information comprises the device display-name of the terminal of the target user;

receiving, by the presence server, presence information, wherein the presence information is published by the communication service server according to the received user registration state information, and the presence information contains the device display-name of the terminal of the target user; and obtaining, by the presence server, the device display-name of the terminal of the target user from the presence information.

10. The method according to claim 1, wherein the communication service function entity is a presence server, and the presence server obtaining of the device display-name of the terminal of the target user comprising:

receiving, by the presence server, presence information published by the terminal of the target user after the terminal of the target user is registered; or receiving, by the presence server, presence information specific to the terminal of the target user, which is published by a communication service server after the terminal of the target user is registered;

wherein the presence information comprises the device display-name of the terminal of the target user;

obtaining, by the presence server, the device display-name of the terminal of the target user from the presence information.

11. The method according to claim 1, wherein the communication service function entity is a presence server, and the presence server obtaining of the ongoing session state information in the terminal of the target user comprising:

receiving, by the presence server, presence information, wherein the presence information is published by the terminal of the target user when a state of a session joined by the terminal of the target user is changed; wherein the presence information comprises the ongoing session state information in the terminal of the target user; and obtaining, by the presence server, the ongoing session state information in the terminal of the target user from the presence information published by the terminal of the target user.

12. The method according to claim 1, wherein the communication service function entity is a presence server, and the presence server obtaining of the ongoing session state information in the terminal of the target user comprises:

receiving, by the presence server, presence information, wherein the presence information is obtained from the presence server and published by a communication service server located in a home network of the terminal of the target user when a state of a session joined by the terminal of the target user is changed, and the presence information comprises the ongoing session state information in the terminal of the target user; and obtaining, by the presence server, the ongoing session state information in the terminal of the target user from the presence information published by the communication service server.

13. The method according to claim 1, wherein the ongoing session state information comprises at least the following:

a service type of the session, version information, a communication media type and an encoding format used in the session, a session ID, a session start time, and the number of participants.

14. The method according to claim 1, wherein the target user corresponds to one or more terminals.

15. A communication service function entity having a processor and a memory coupled to the processor, comprising:

a receiving unit 901, adapted to receive a device information obtaining request; and a sending unit 902, adapted to in response to a device information obtaining request, send the device information of a target user to a requesting terminal according to the target user ID which is carried within the device information obtaining request, wherein the device information obtaining request is authorized according to at least one of a presence information authorization rule and notification filtering policy of the target user, or according to a local subscription notification and authorization policy, wherein the device information comprises a device display-name of a terminal of the target user, which is defined for the terminal by the target user, and ongoing session state information in the terminal of the target user;

an obtaining unit, adapted to obtain the device display-name of a terminal of the target user, and the ongoing session state information in the terminal of the target user;

a storing unit, adapted to associate an ID of the target user, and store the device display-name of the terminal of the target user, and the ongoing session state information in the terminal of the target user obtained by the obtaining unit as the device information of the target user; wherein the communication service function entity obtains the ongoing session state information when the state of the session joined by the user terminal is changed, associates the session state information with a user ID and stores the session state information in the device information of user terminals; and the sending unit, adapted to extract the device information of the target user from the storing unit according to the target user ID.

* * * * *